(12) United States Patent
Edwards

(10) Patent No.: US 7,222,808 B2
(45) Date of Patent: May 29, 2007

(54) MULCHER WITH IMPROVED TOOTH DESIGN

(75) Inventor: John W. Edwards, Tampa, FL (US)

(73) Assignee: Attachment Technologies, Inc., Cedar Rapids, IA (US)

( * ) Notice: Subject to any disclaimer, the term of this patent is extended or adjusted under 35 U.S.C. 154(b) by 0 days.

(21) Appl. No.: 10/975,410

(22) Filed: Oct. 29, 2004

(65) Prior Publication Data

US 2005/0098331 A1    May 12, 2005

Related U.S. Application Data

(60) Provisional application No. 60/515,433, filed on Oct. 30, 2003.

(51) Int. Cl.
*B02C 18/16* (2006.01)
(52) U.S. Cl. ........................................ 241/294; 241/300
(58) Field of Classification Search ................ 241/294, 241/300
See application file for complete search history.

(56) References Cited

U.S. PATENT DOCUMENTS

| | | | |
|---|---|---|---|
| 5,582,353 A | 12/1996 | Willibald | |
| 5,692,689 A | 12/1997 | Shinn | |
| 5,794,866 A | 8/1998 | Shinn | |
| 5,848,627 A | 12/1998 | Brown | |
| 5,873,534 A * | 2/1999 | Shinn | ............................ 241/294 |
| 6,176,445 B1 | 1/2001 | Shinn | |
| 6,435,434 B1 * | 8/2002 | Monyak | ........................ 241/197 |
| 6,481,655 B1 * | 11/2002 | Feigel, Jr. | ..................... 241/294 |

OTHER PUBLICATIONS

Photographs of Cutter Element, 1 page.
King Kong Tools, Save Money Less Down-Time, 2 pages.
Hydraulic Applications, FAE Forestry & Agricultural Equipment Brochure, 4 pages.
The Bull Hog, "The toughest, most versatile, most practical wood shredder in the world.", Fecon Resource Recovery Equipment & Systems Brochure, 6 pages.
Kennametal, Road Planing, Soil Stabilization, and Reclamation Tools Brochure, 50 pages.

* cited by examiner

*Primary Examiner*—Mark Rosenbaum
(74) *Attorney, Agent, or Firm*—Nixon & Vanderhye P.C.

(57) ABSTRACT

A mulcher apparatus includes a tractor and a mulcher unit provided to the tractor. The mulcher unit includes a tooth assembly with a holder and a cutter element with a cooperating notch portion and cross bar arrangement. The notch portion can be retrofit to existing holder arrangements. The cutter element may include various features, to enhance cutting efficiency. For example, the cutter elements may include a double-ended structure, angle tab portions at each corner portion, carbide coatings, a pair of tip portions at each end with a space therebetween, and/or a generally H-shaped configuration.

54 Claims, 37 Drawing Sheets

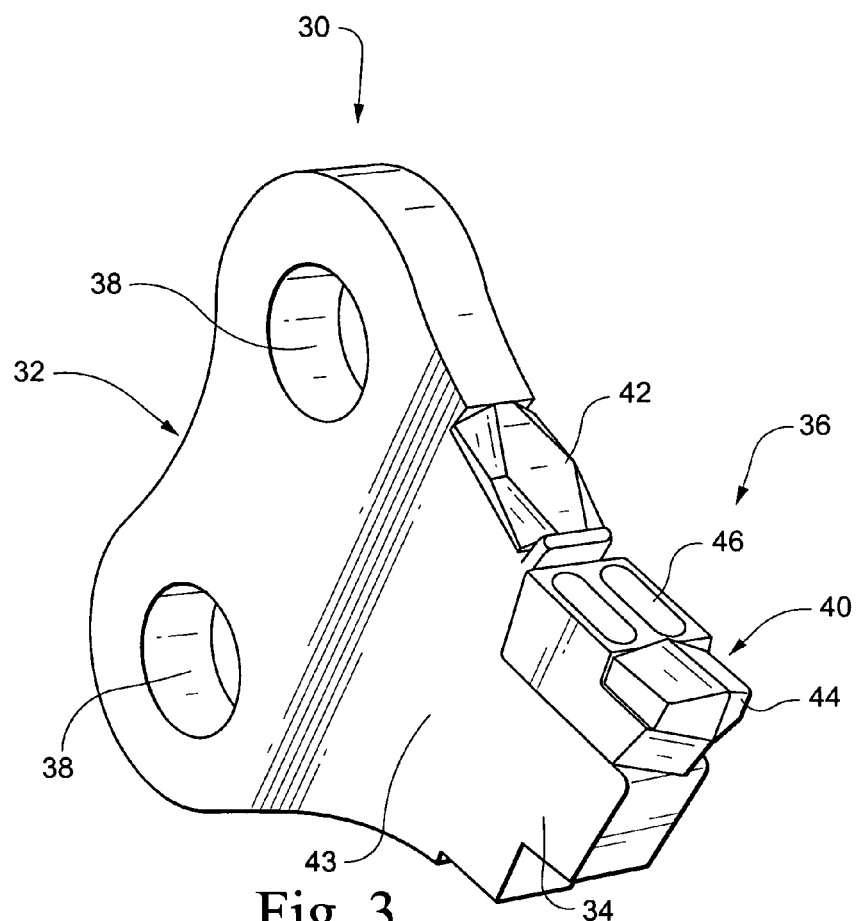
Fig. 3
RELATED ART
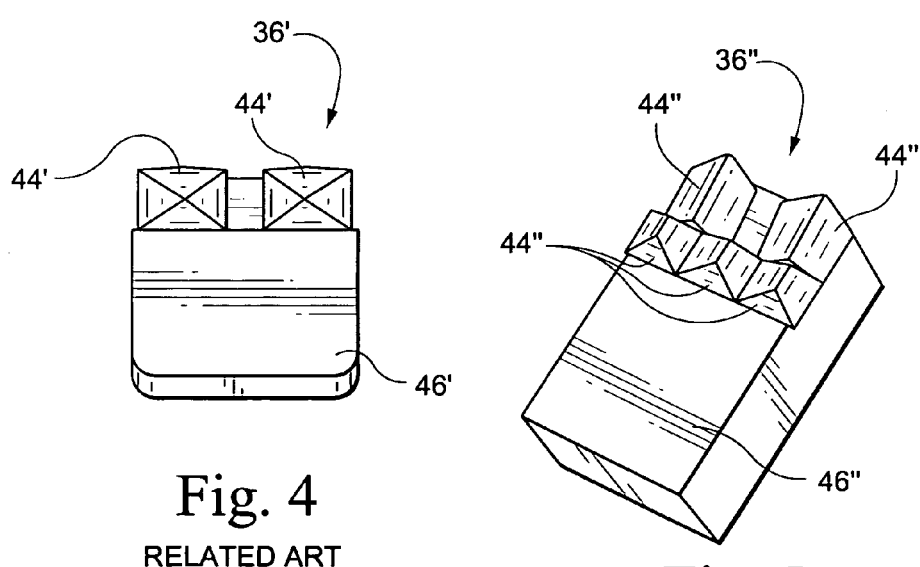
Fig. 4
RELATED ART
Fig. 5
RELATED ART

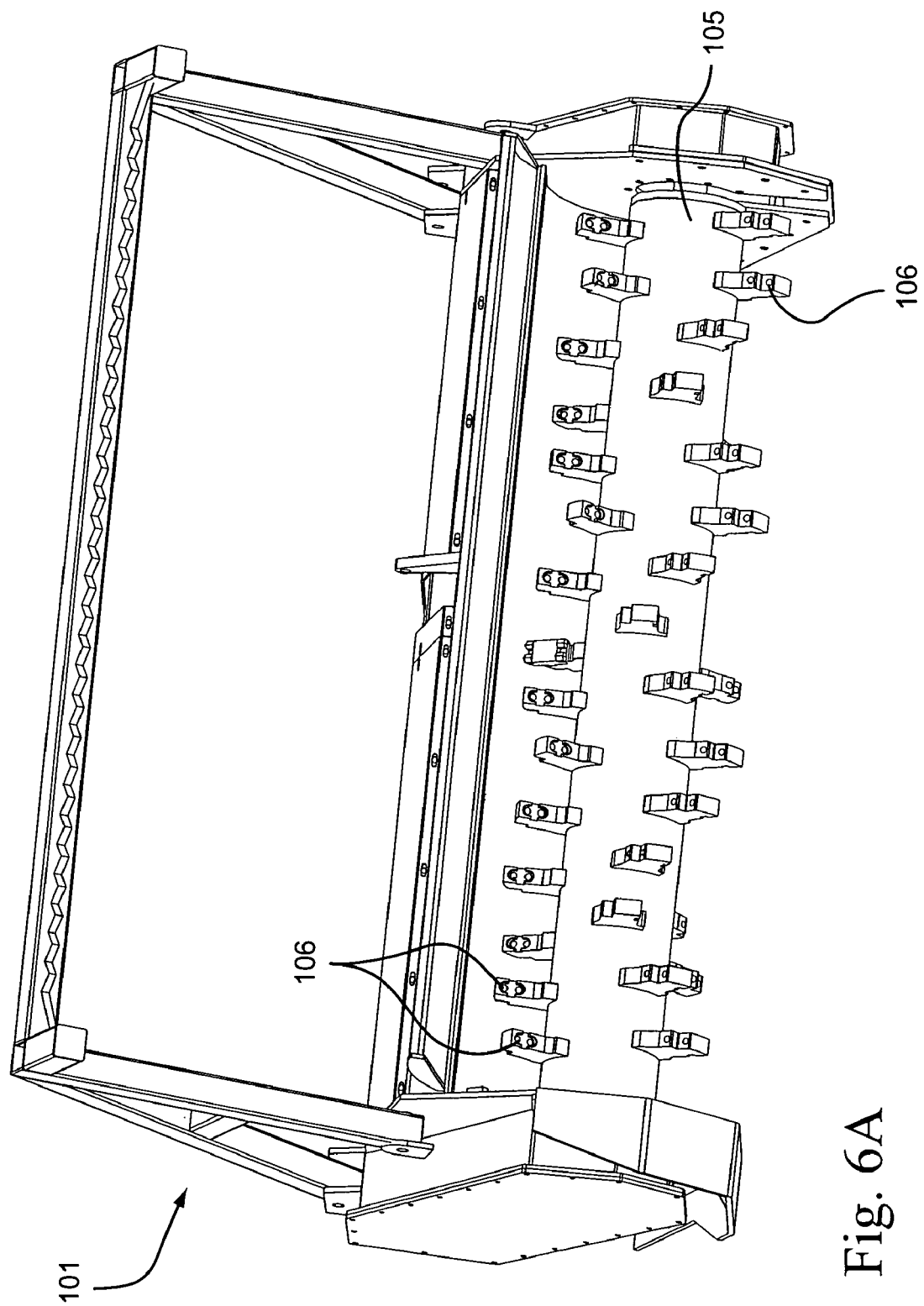

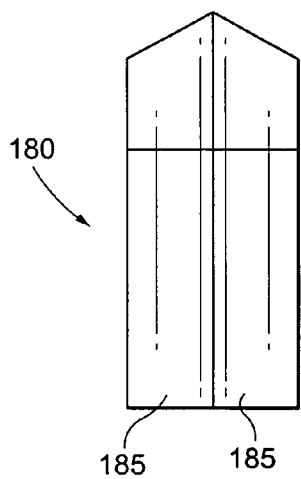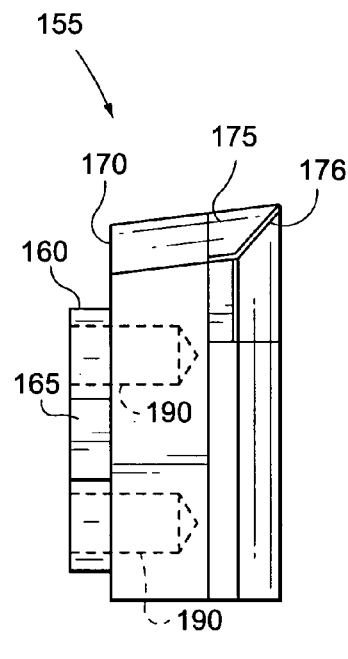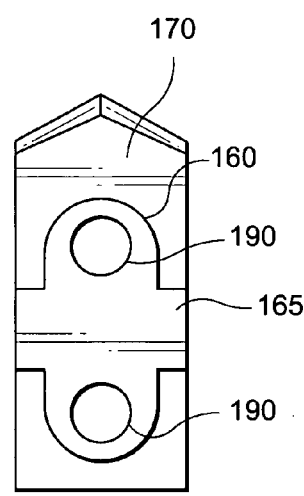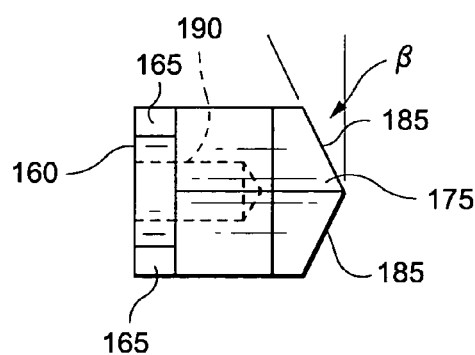
Fig. 13
Fig. 11
Fig. 12
Fig. 14

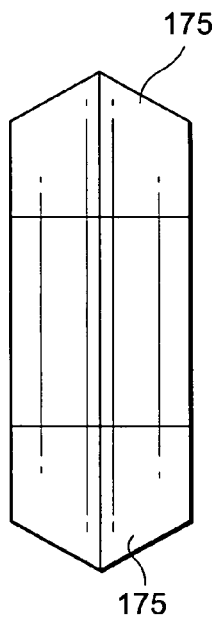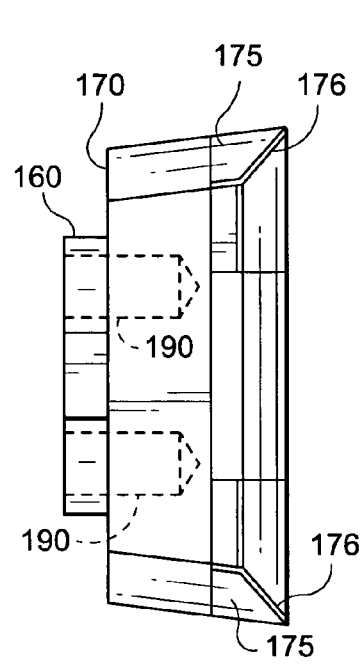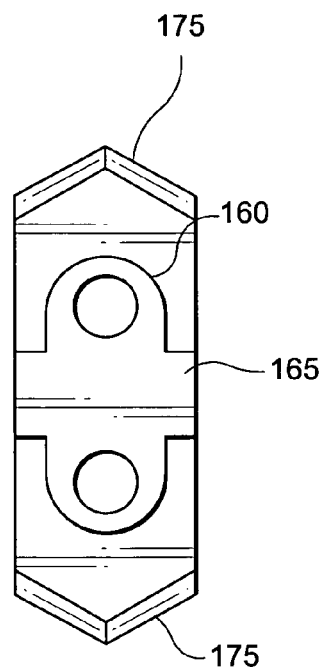
Fig. 17    Fig. 15    Fig. 16
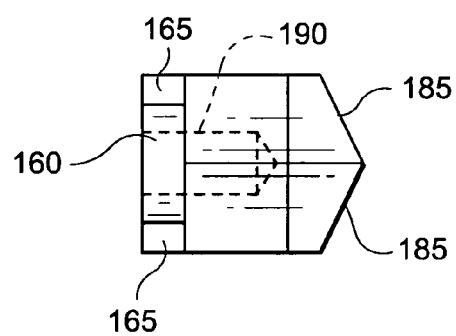
Fig. 18

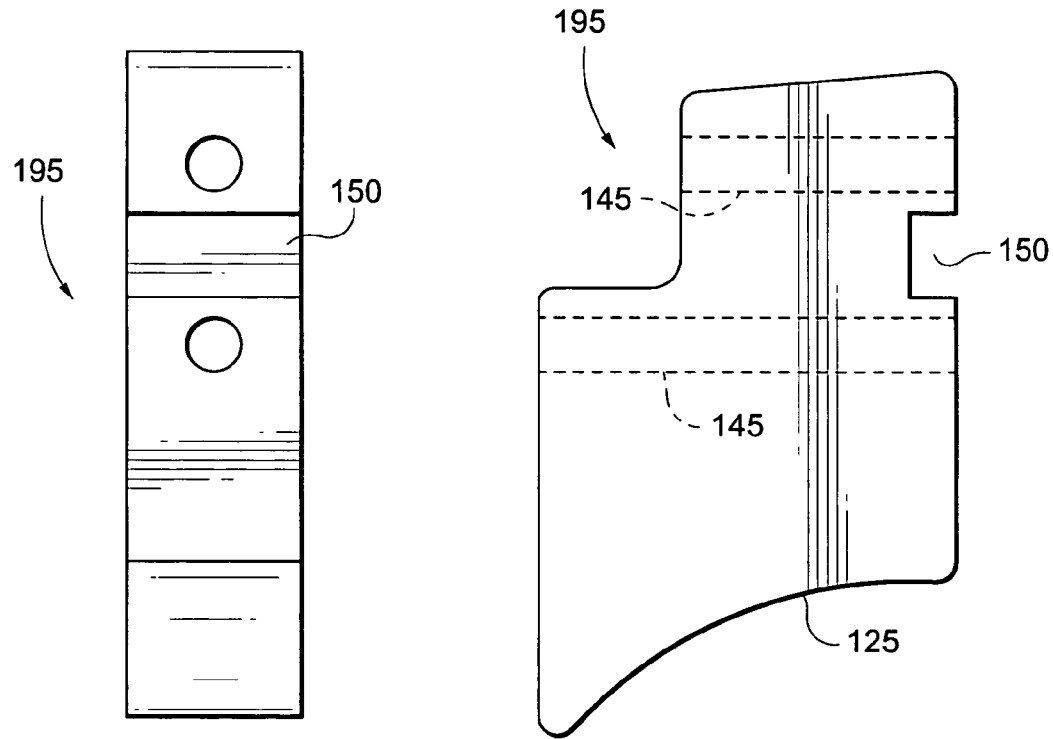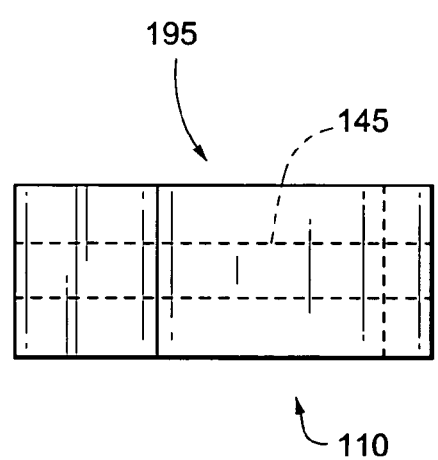

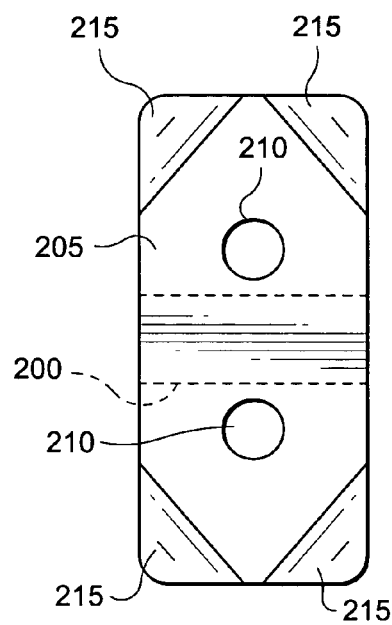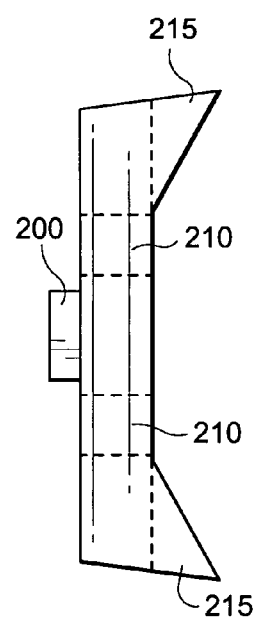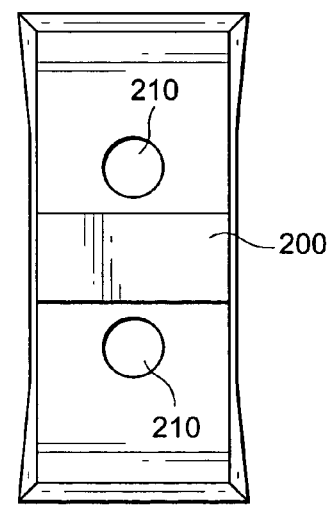
Fig. 28　　Fig. 26　　Fig. 27
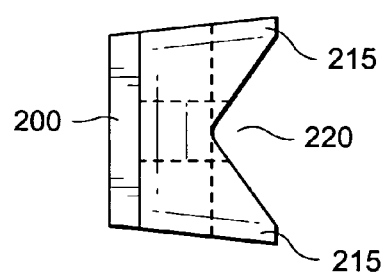
Fig. 29

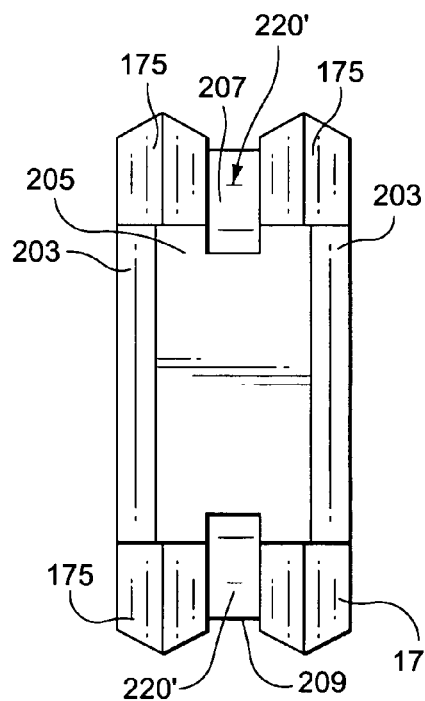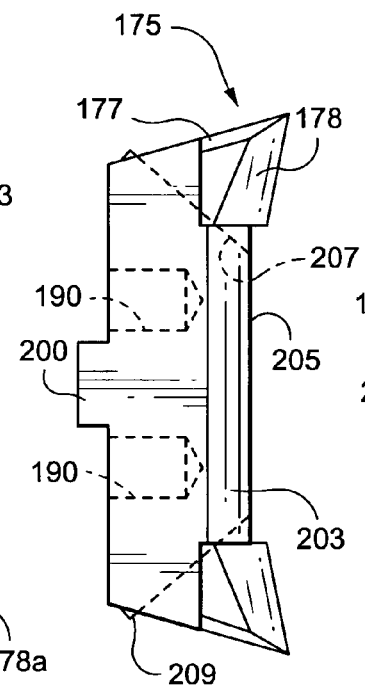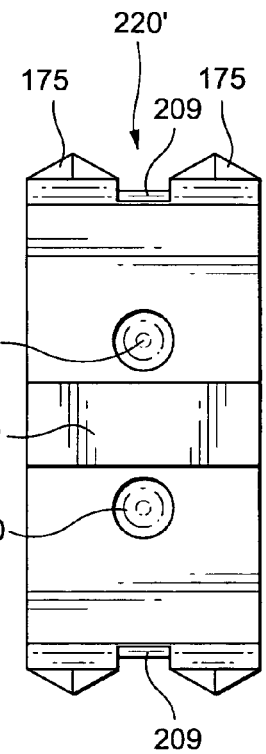
Fig. 32A　　　Fig. 30A　　　Fig. 31A
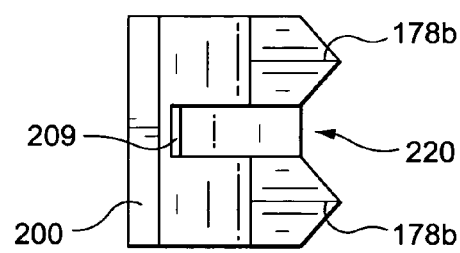
Fig. 33A

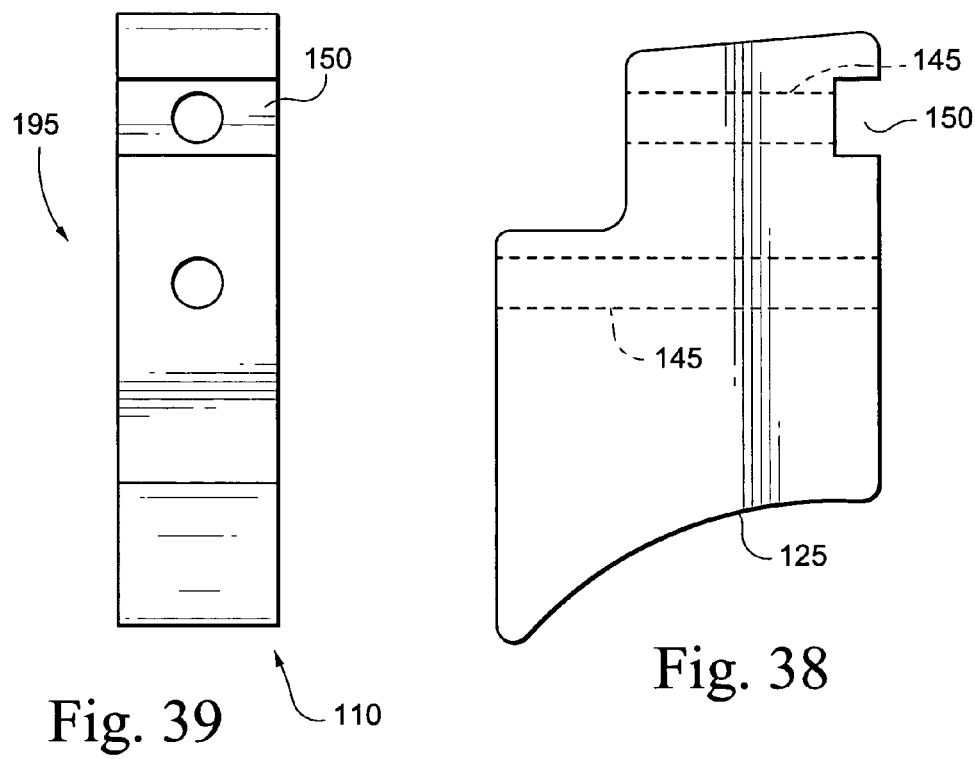
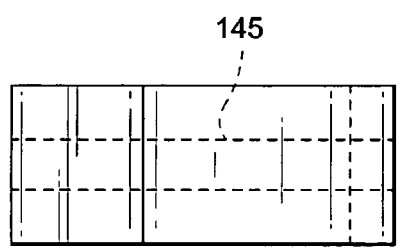
Fig. 40

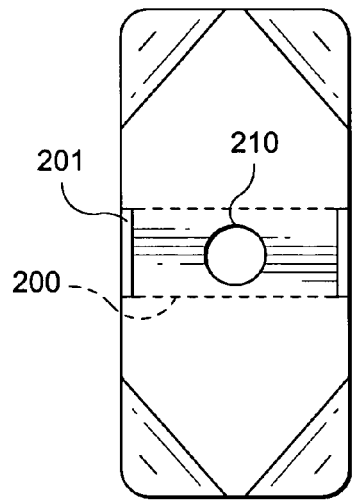
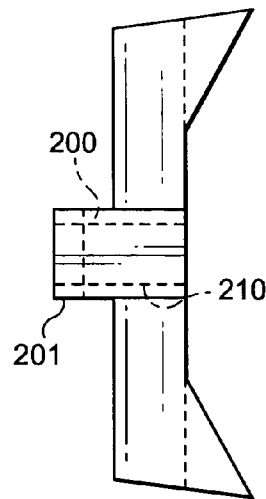
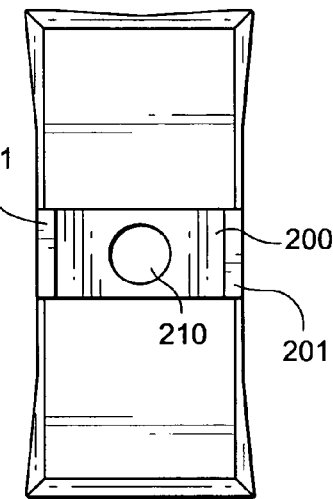
Fig. 46A     Fig. 44A     Fig. 45A
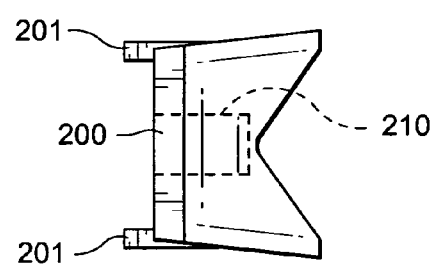
Fig. 47A

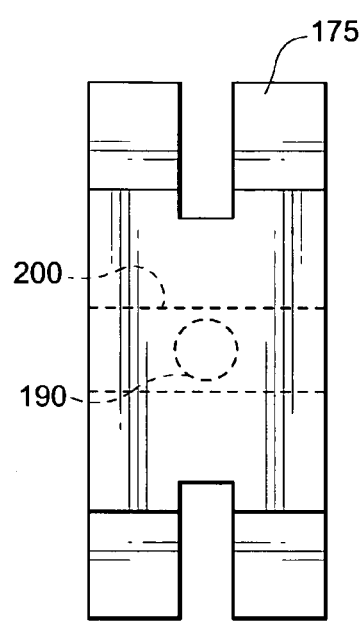
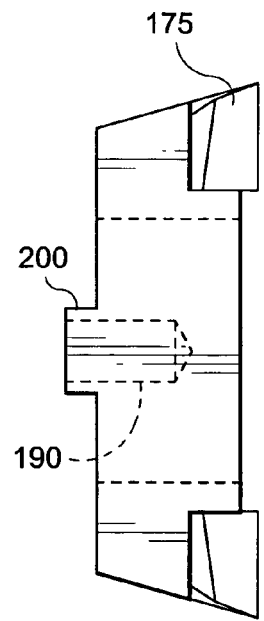
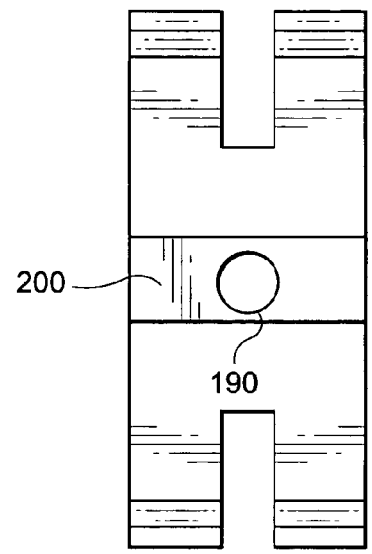
Fig. 50　　　Fig. 48　　　Fig. 49
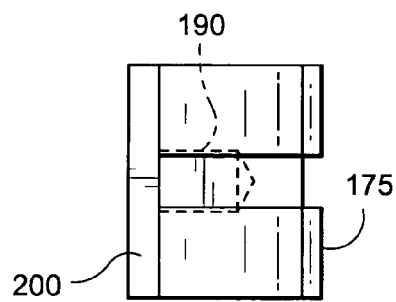
Fig. 51

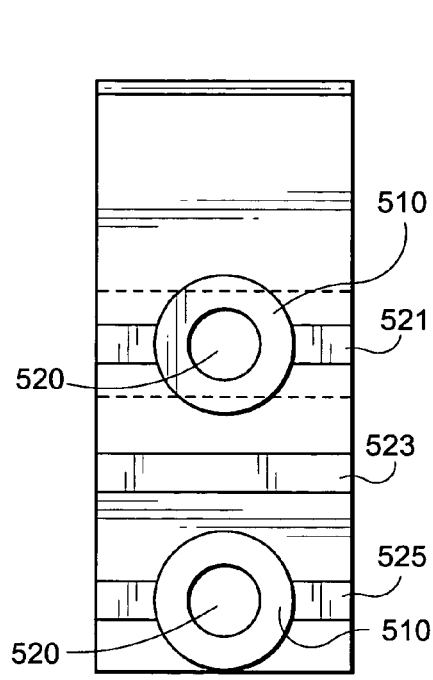
Fig. 59
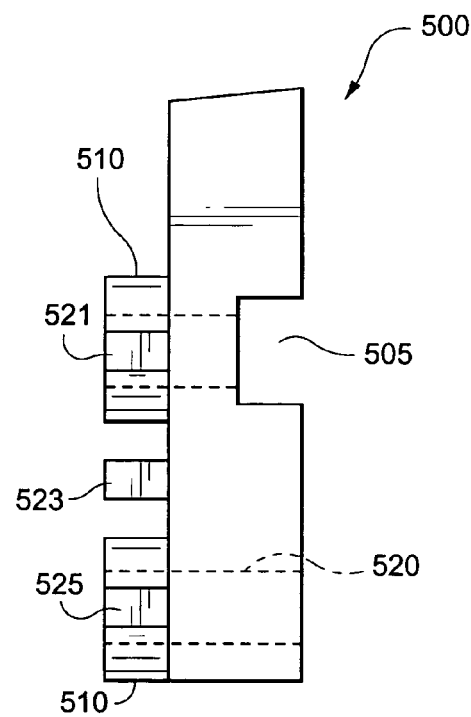
Fig. 58
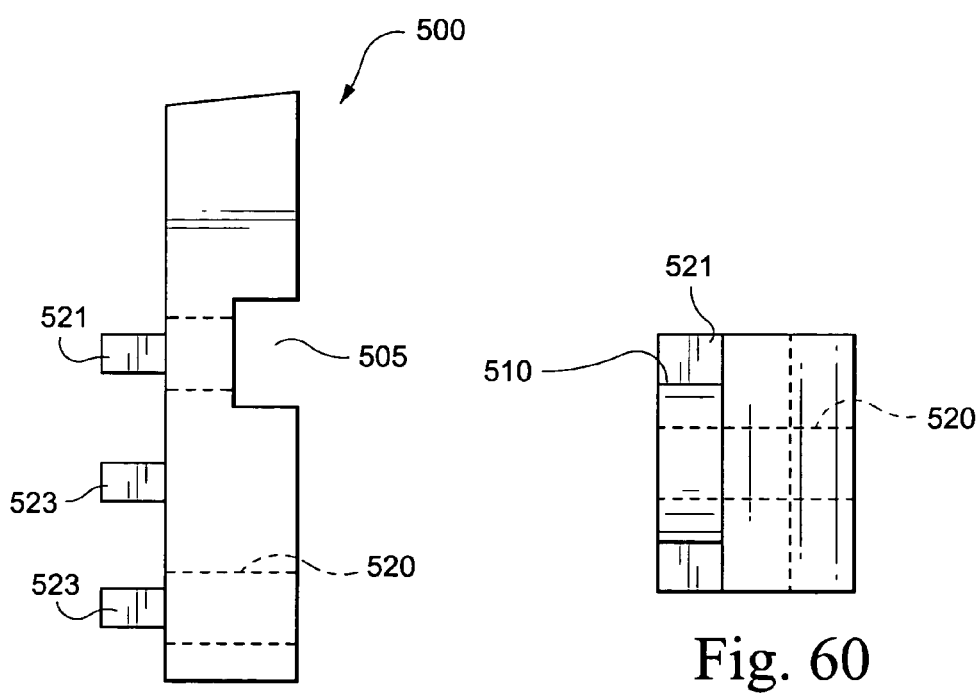
Fig. 58A
Fig. 60

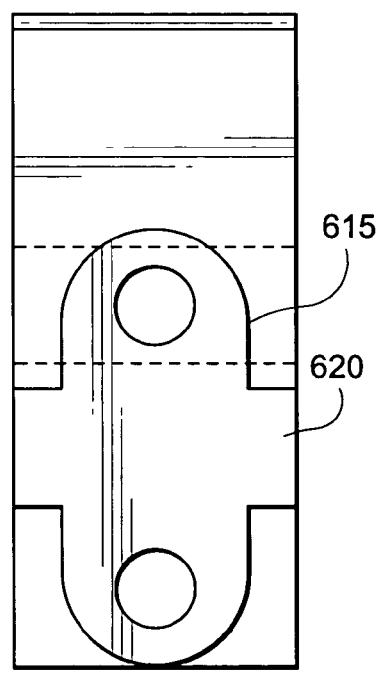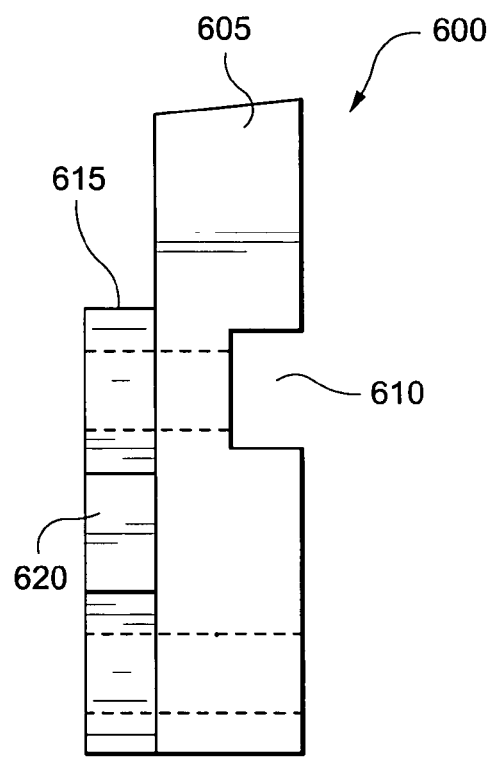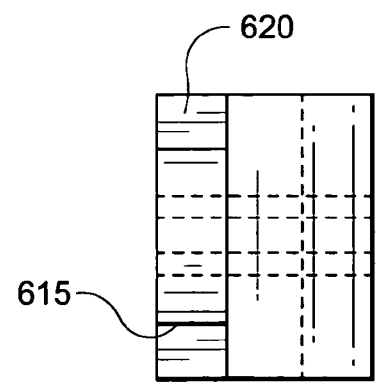
Fig. 62
Fig. 61
Fig. 63

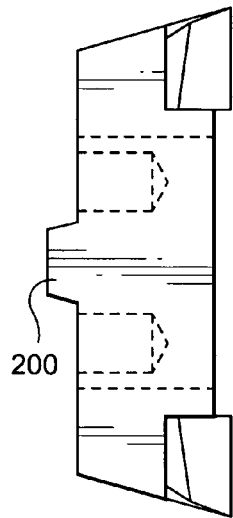 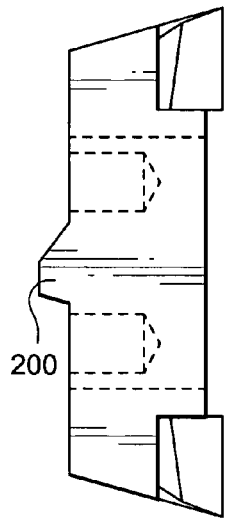 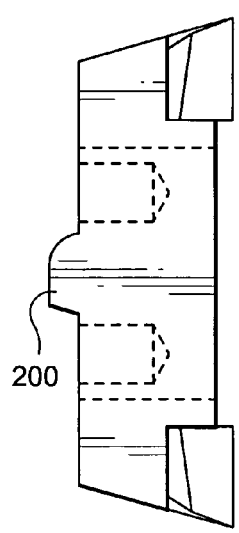 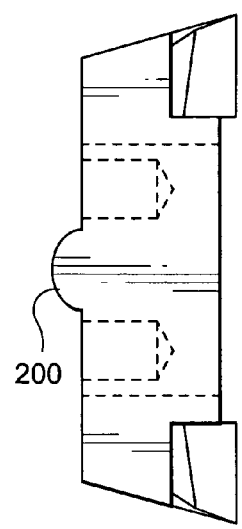
Fig. 64  Fig. 65  Fig. 66  Fig. 67
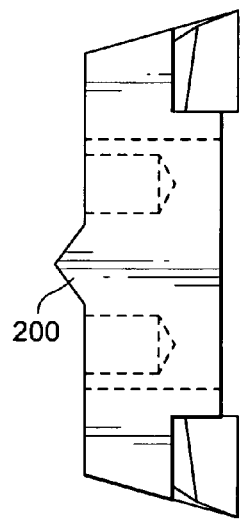 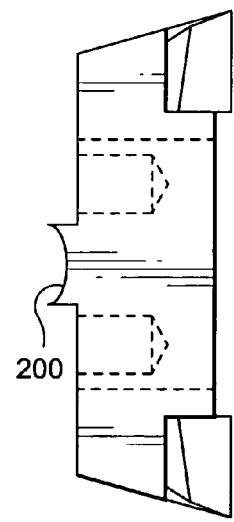 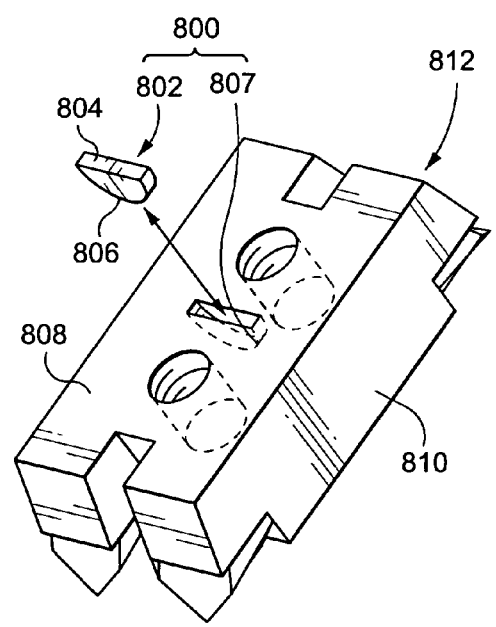
Fig. 68  Fig. 69  Fig. 69A

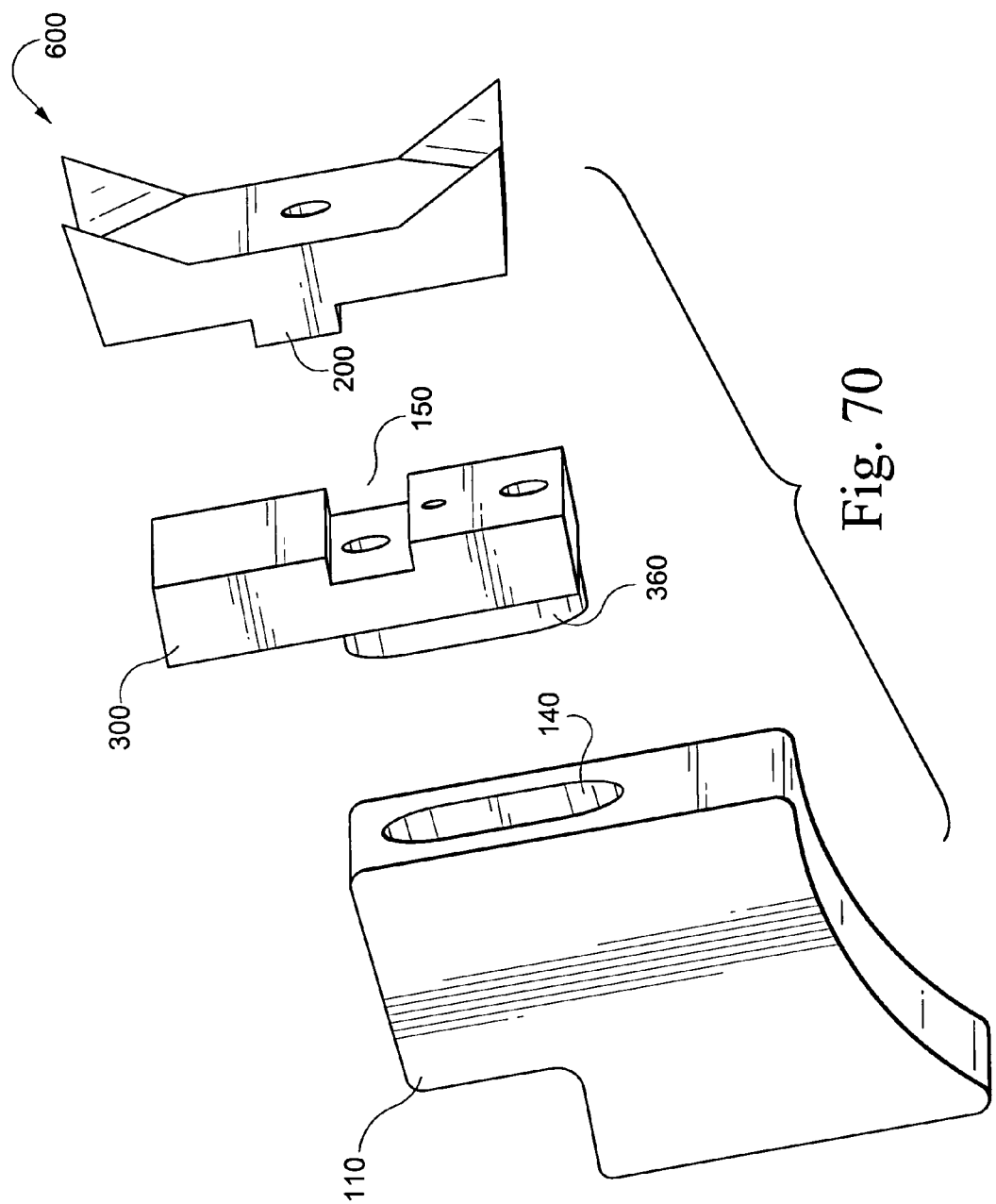

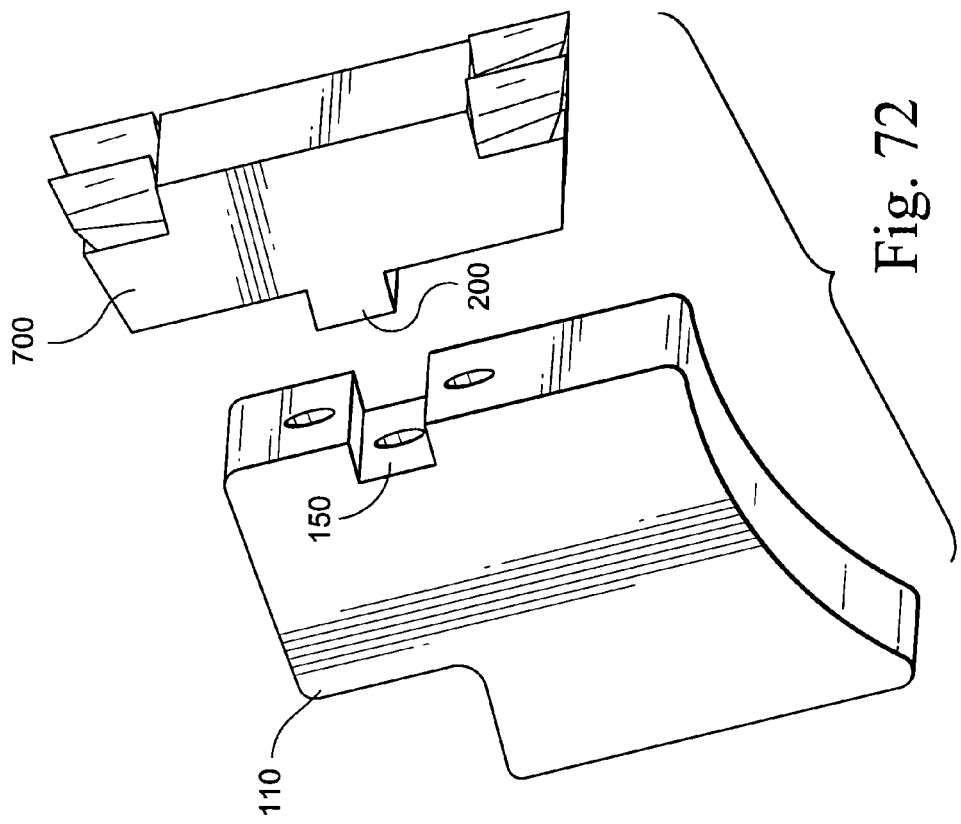
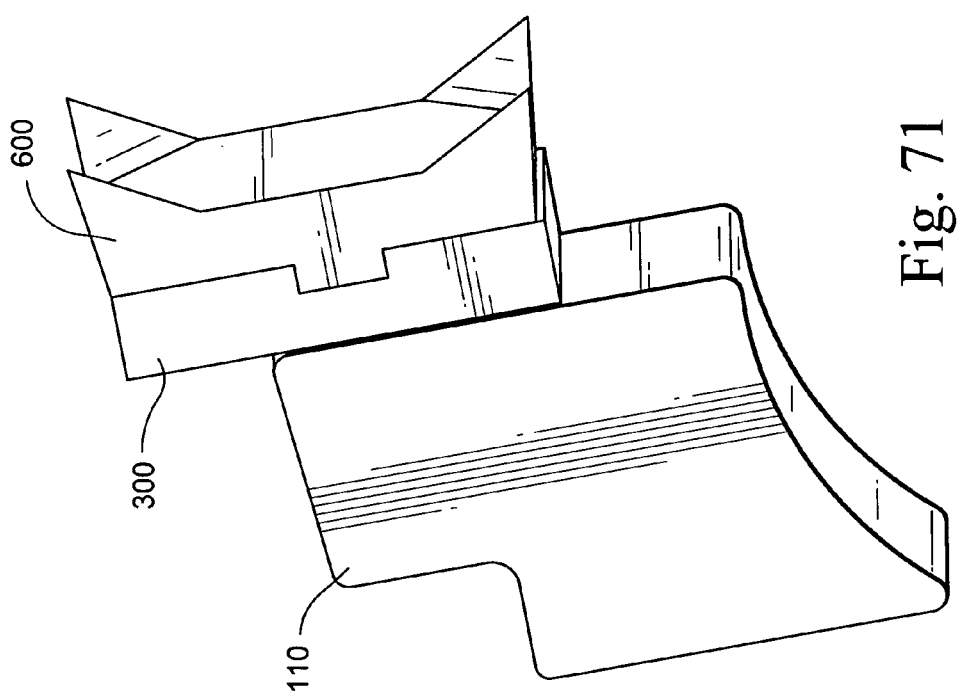

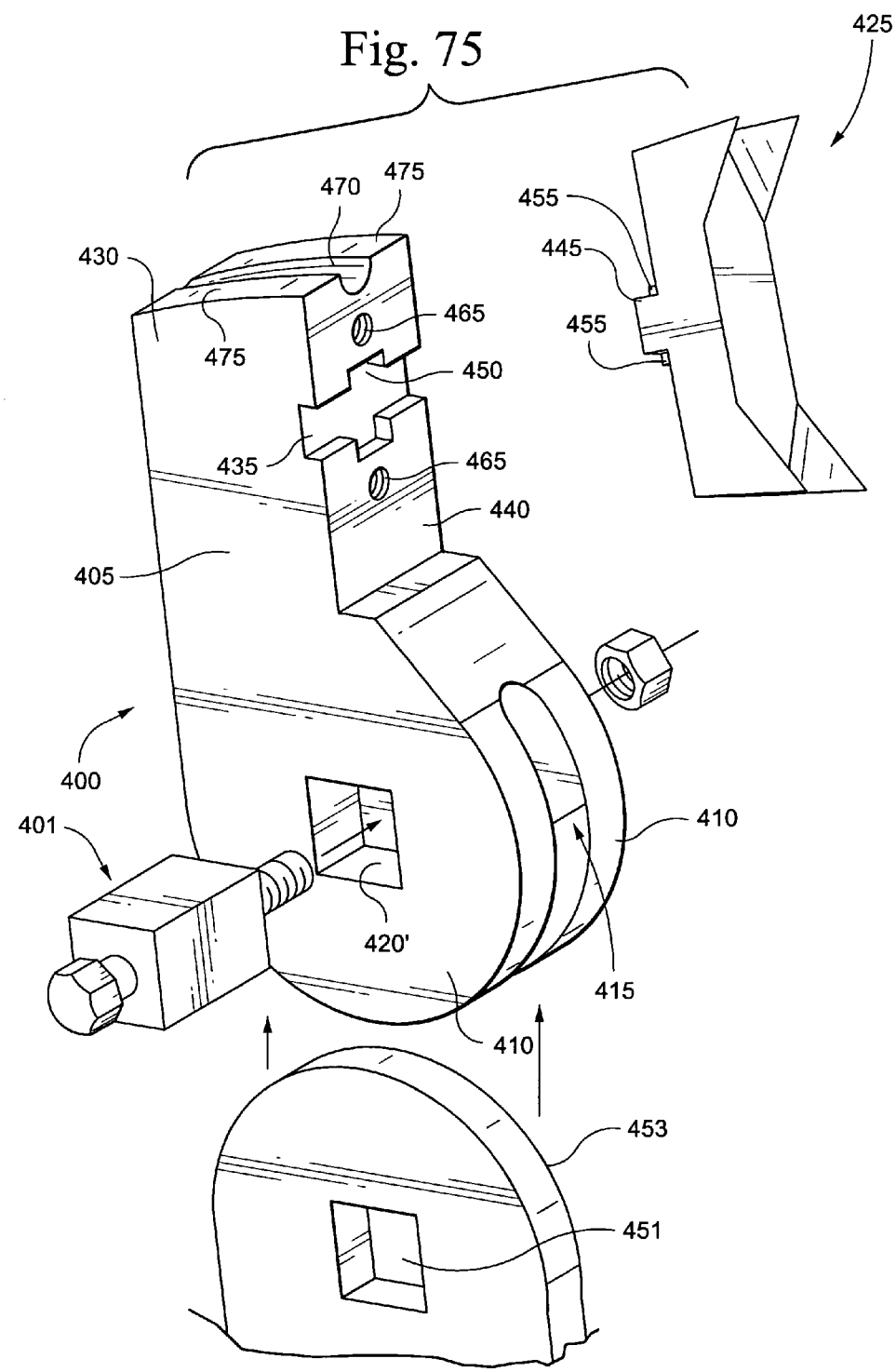

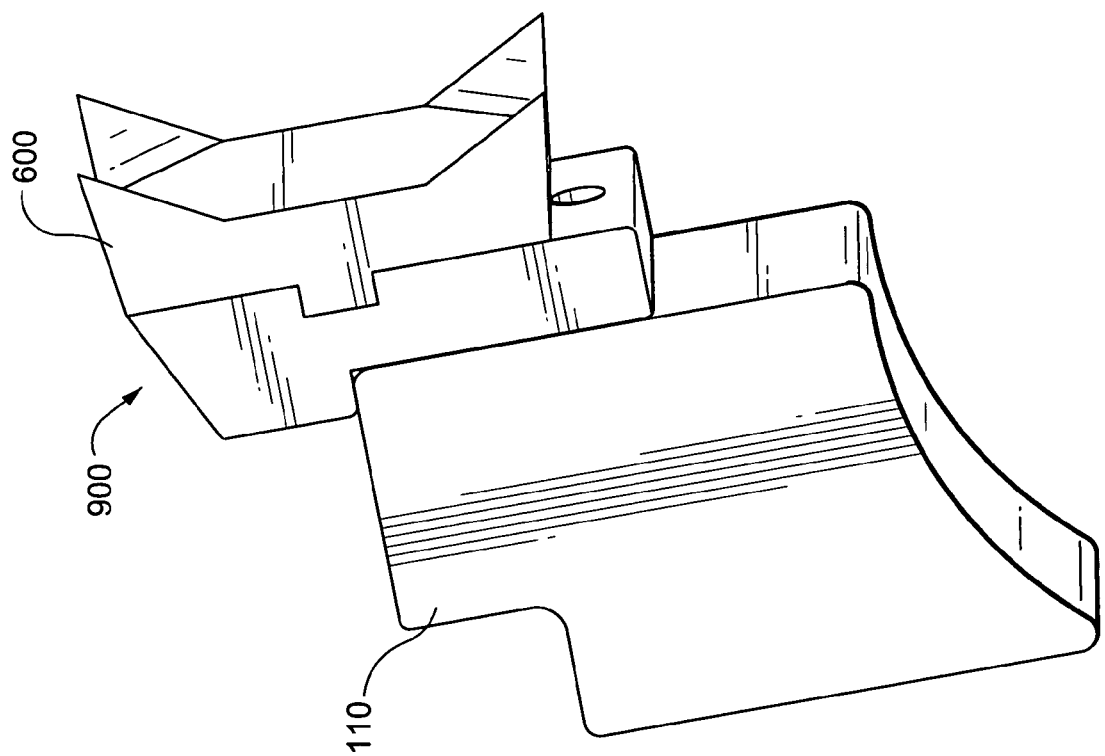

MULCHER WITH IMPROVED TOOTH DESIGN

CROSS REFERENCE TO PRIORITY APPLICATION

This application claims the benefit of U.S. Provisional Application No. 60/515,433, filed Oct. 30, 2003, incorporated by reference in its entirety.

BACKGROUND OF THE INVENTION

1. Field of the Invention

This invention relates to an industrial mulcher apparatus for use in mulching vegetation such as brush, trees, etc., or stump grinding. In particular, the invention relates to improvements to a mulcher unit including a plurality of cutter assemblies that serially engage and mulch the intended vegetation in rapid fashion.

2. Description of Related Art

FIGS. 1-5 illustrate a related art mulcher apparatus 10. The mulcher apparatus 10 includes a tractor 12 supported on a set of wheels 14. A tractor driver can sit within a protected cage 16 positioned on a frame of the mulcher apparatus 10. A hydraulic unit 18 connected to the tractor 12 provides structure by which a mulcher unit 20 is positioned, e.g., laterally shifted, raised and/or lowered. The tractor 12 is commercially available from Barco, a manufacturer of tractors. Also, many details of the mulcher apparatus 10 shown in FIG. 1 are described in U.S. Pat. Nos. 5,813,792 and 6,484,811, herein incorporated by reference in their entirety.

The tractor 12 is provided with one or more power sources, e.g., motors, sufficient to drive the tractor at a desired speed and to rotate the mulcher unit 20 in the direction of arrow A. The mulcher unit 20 can rotate at a speed of about 1,700 rpm, for example.

As shown in FIG. 2, the mulcher unit 20 includes a power driven rotatable shaft 22 on which a plurality of axially spaced support disks 24 are mounted. Each disk 24 includes a through hole 26 through which a support rod 28 is guided and secured, e.g., via welding. The mulcher unit 20 includes a plurality of tooth assemblies 30 each supported on the support rods 28. Each tooth assembly 30 includes a base portion 32 and a head portion 34. The head portion 34 includes a cutter element 36 described below.

As shown in FIG. 3, each base portion 32 includes one or more through holes 38 through which the support rods 28 are guided in order to support each tooth assembly 30 in a non-rotatable fashion. FIG. 3 also shows that the cutter element 36 includes a primary cutter element 40. A deflecting element or secondary cutter element 42 is provided on a central portion 43 of the tooth assembly 30 which is intermediate the base portion 32 and the head portion 34. The primary cutter element 40 may include a tip portion 44 made of a carbide material which is provided, e.g., welded or glued, to a base portion 46 of the primary cutter element 40.

Referring back to FIG. 2, the cutter element 36 is connected to the head portion 34 of the tooth assembly 30 as follows. The base portion 46 of the cutter element 36 is provided with a shroud 48 which is integrally formed with and extends away from a rear side 31a of the cutter element 36. The shroud 48 is generally oval or hour-glass shaped (see FIG. 7 and description below) and includes a pair of pre-threaded bores 33 for receiving a pair of bolts 50. The head portion 34 of the tooth assembly is provided with a countersunk aperture matching the shape of the shroud 48 so that, upon assembly, the cutter element 36 and the head portion 34 fit together like a puzzle. In FIG. 2, the bolts 50 and the shroud 48 of one of the tooth assemblies 30 are shown in phantom to facilitate understanding of the connection between the cutter element 36 and the head portion 34.

FIGS. 4 and 5 show alternative versions of the cutter element. FIG. 4 includes a cutter element 36' having a pair of tip portions 44' provided on a base portion 46'. FIG. 5 illustrates a cutter element 36" including first and second rows of tip portions 44' that are provided to a base portion 46".

There are several disadvantages associated with the mulcher apparatus shown in related art FIGS. 1-5. In particular, with respect to the connection between the cutter element 36 and the head portion 34, the provision of a raised shroud 48 with pre-threaded bores requires difficult machining operations and is therefore relatively expensive to manufacture. In addition, the mounting assembly for mounting the tooth assembly 30 to the rotatable shaft 22 is difficult and cumbersome, in part, because it requires a plurality of support disks 24 having bores 26 for receiving rods 28. Also, the central portion 43 requires a secondary cutter or deflecting element since it may inadvertently contact the intended target. Finally, the positioning of each tooth element is such that a significant number of the cutter elements 36 may contact the intended target at the same time, thereby slowing rotation of the shaft 22 with a commensurate decrease in power.

Accordingly, a need has developed in the art to provide a mulcher apparatus which addresses the above-noted deficiencies.

BRIEF SUMMARY OF THE INVENTION

One aspect of the invention relates to providing a mulcher apparatus including a mulcher unit and/or cutter assembly with improved cutting efficiency and cost effectiveness for labor and/or replacement parts.

Another aspect is to provide an improved tool assembly that may be retrofit to existing mulcher apparatus.

According to one embodiment, a tooth assembly for a mulcher apparatus comprises a holder including a base portion adapted to be connected to the mulcher apparatus and a head portion provided opposite the base portion, the head portion being provided with a cutter element receiving surface including at least one notch portion extending from one lateral side of the head portion to the other lateral side of the head portion; and a cutter element provided to the head portion holder, the cutter element including at least one cross bar engaged with the at least one notch portion of the holder.

According to another embodiment, a cutter element for a mulcher apparatus comprises a main body including a rear portion configured to be mounted on a cutter element receiving surface of a holder and a front portion including at least one cutter tip portion; and a cross bar provided to and extending from the rear portion of the main body, said cross bar being structured to engage with a notch portion on the holder.

In yet another embodiment, a cutter element for a mulcher apparatus comprises a main body including a rear portion configured to be mounted on a cutter element receiving surface of a holder and a front portion including at least one cutter tip portion, wherein the main body includes first and second ends including at least one said cutter tip portion.

In still another embodiment, a cutter element for a mulcher apparatus comprises a main body including a rear portion configured to be mounted on a cutter element receiving surface of a holder and a front portion including at least one cutter tip portion, wherein the main body is substantially rectangular and includes a plurality of corner portions with forwardly angled tab portions, each of said corner portions defining one said at least one cutter tip portion.

In a further embodiment, a cutter element for a mulcher apparatus comprises a main body including a rear portion configured to be mounted on a cutter element receiving surface of a holder and a front portion including at least one cutter tip portion, wherein the main body has a generally H-shape with a cross component and two upright components, each of said upright components including first and second ends each provided with one said cutter tip portion, a space being provided between adjacent cutter tip portions to allow for the flow of debris through the space.

These and other aspects of the invention will be described and/or apparent from the following detailed description of preferred embodiments.

BRIEF DESCRIPTION OF THE DRAWINGS

Preferred embodiments of the invention will be described in conjunction with the following drawings, in which like reference numbers refer to like parts, and wherein:

FIG. 3 is a perspective view of a tooth assembly shown in the mulcher unit of FIG. 2;

FIGS. 4 and 5 represent alternative cutter elements according to the related art;

FIGS. 6A and 6B illustrate a portion of a mulcher apparatus according to an embodiment of the present invention;

FIG. 11 is a side view of a cutter element of the present invention;

FIG. 12 is a right side view thereof;

FIG. 13 is a left side view thereof;

FIG. 14 is a top view thereof;

FIG. 15 is a side view of a cutter element according to another embodiment of the present invention;

FIG. 16 is a right side view thereof;

FIG. 17 is a left side view thereof;

FIG. 18 is a top view thereof;

FIG. 23 is a side view of a holder according to yet another embodiment of the present invention;

FIG. 24 is a top view thereof;

FIG. 25 is a right side view thereof;

FIG. 26 is a side view of a cutter element according to still another embodiment of the present invention;

FIG. 27 is a right side view thereof;

FIG. 28 is a left side view thereof;

FIG. 29 is a top view thereof;

FIG. 30A is a side view of a cutter element according to another embodiment according to the present invention;

FIG. 31A is a right side view thereof;

FIG. 32A is a left side view thereof;

FIG. 33A is a top view thereof;

FIG. 38 is a side view of a holder according to yet another embodiment of the present invention;

FIG. 39 is a right side view thereof;

FIG. 40 is a top view thereof;

FIG. 44A illustrates still another cutter element according to an embodiment of the present invention;

FIG. 45A is a right side view thereof;

FIG. 46A is a left side view thereof;

FIG. 47A is a top view thereof;

FIG. 48 illustrates still another embodiment of a cutter element according to the present invention;

FIG. 49 is a right side view thereof;

FIG. 50 is a left side view thereof;

FIG. 51 is a top view thereof;

FIG. 58 illustrates yet another embodiment of an adapter according to the present invention;

FIG. 58A illustrates another embodiment of an adapter according to the present invention;

FIG. 59 is a left side view thereof;

FIG. 60 is a top view thereof;

FIG. 61 illustrates still another embodiment of an adapter according to the present invention;

FIG. 62 is a left side view thereof;

FIG. 63 is a top view thereof;

FIGS. 64-69A illustrate side views of a cutter element similar to that shown in FIG. 30, but which show further embodiments of cross bars according to the present invention;

FIG. 70 is an exploded view of a holder, adapter and cutter element;

FIG. 71 is an assembled view thereof;

FIG. 72 is an exploded view of a holder element and cutter element;

FIG. 75 is an exploded view of a holder and cutter element to another embodiment of the present invention;

FIG. 81 is an assembled view of the tooth assembly shown in FIG. 80.

DETAILED DESCRIPTION OF PREFERRED EMBODIMENTS

Figure 1:
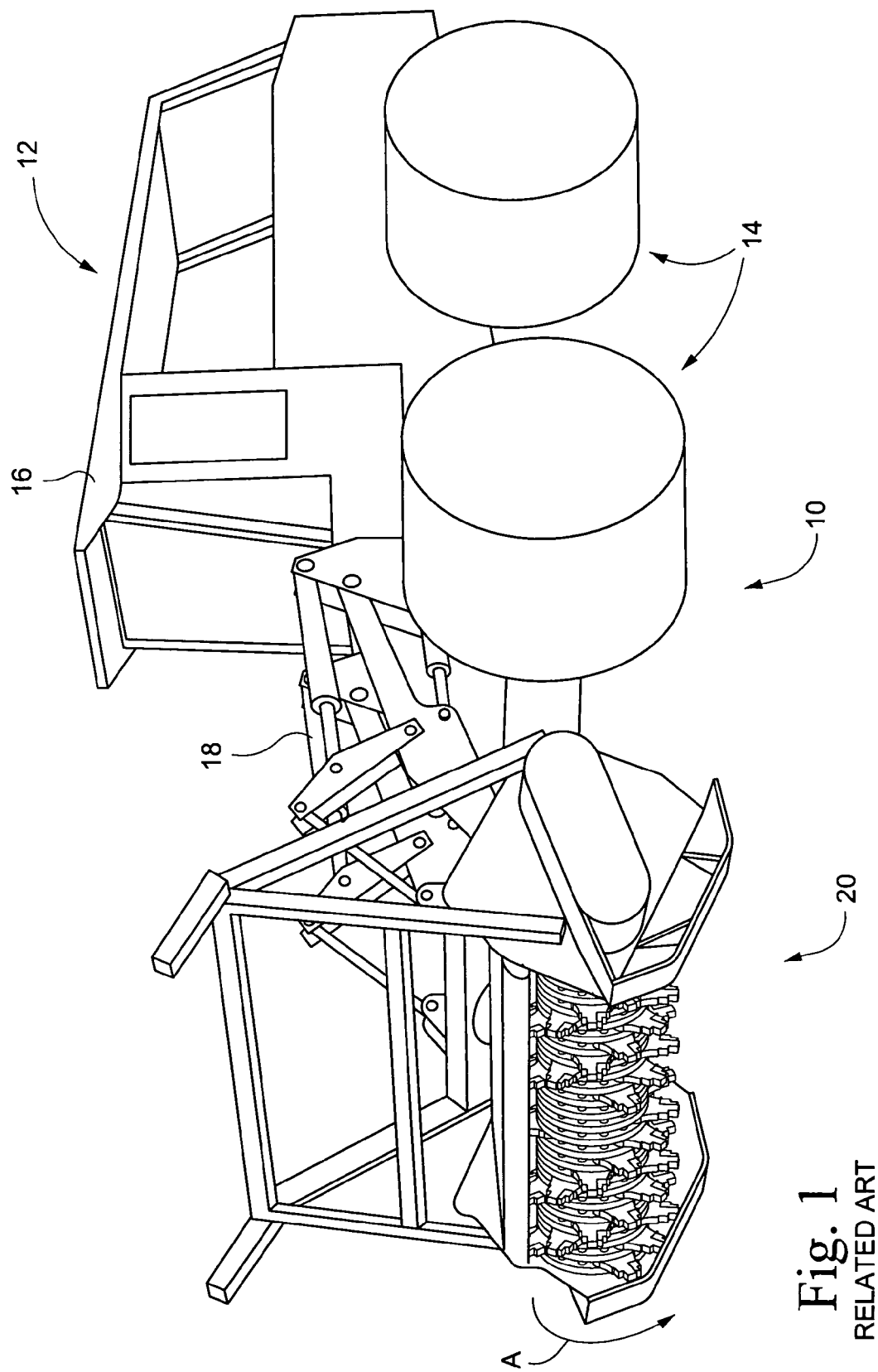
FIG. 1 illustrates a mulching apparatus according to the related art.
Figure 2:
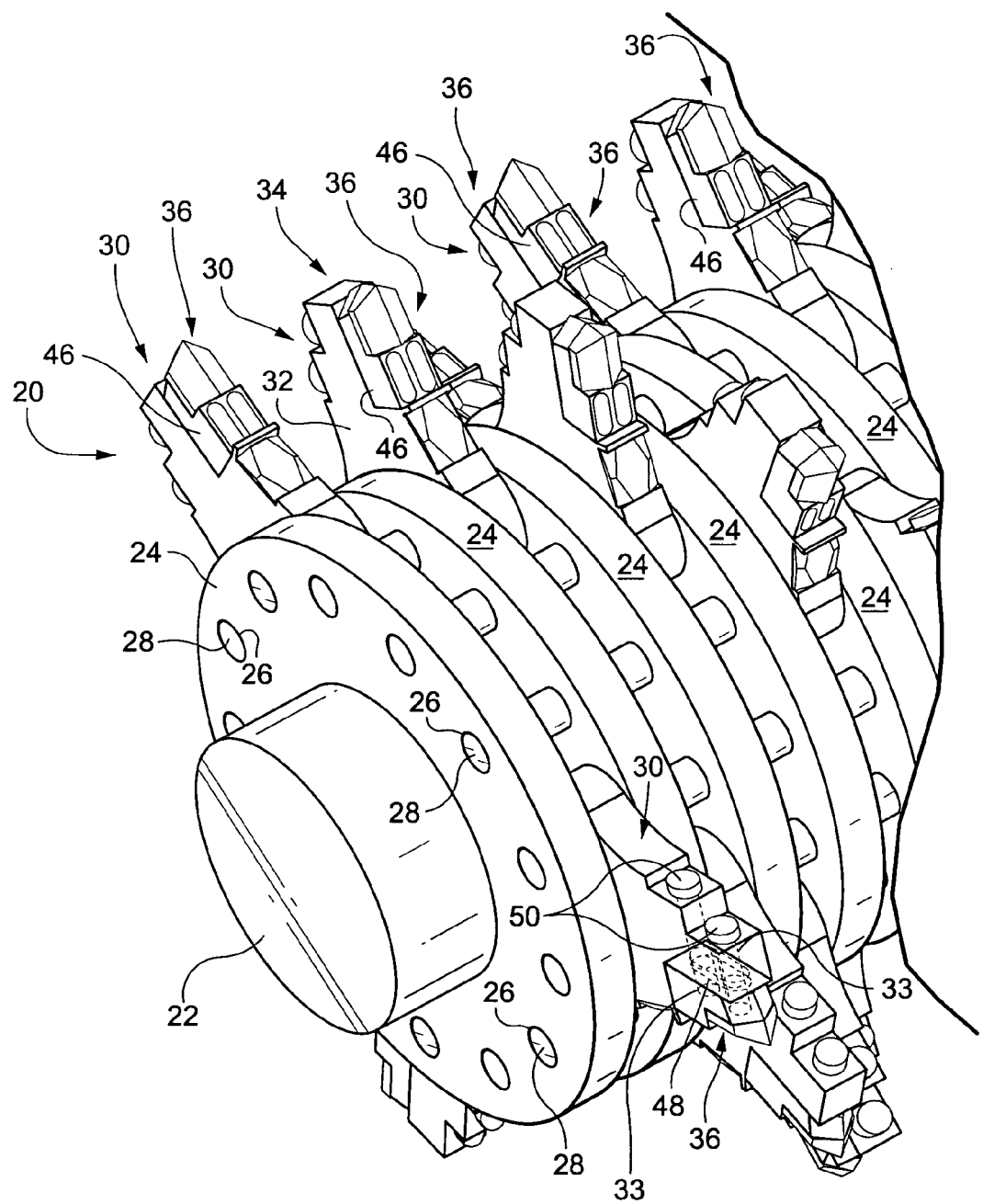
FIG. 2 is an enlarged partial view of the mulcher unit shown in FIG. 1.
Figure 6:
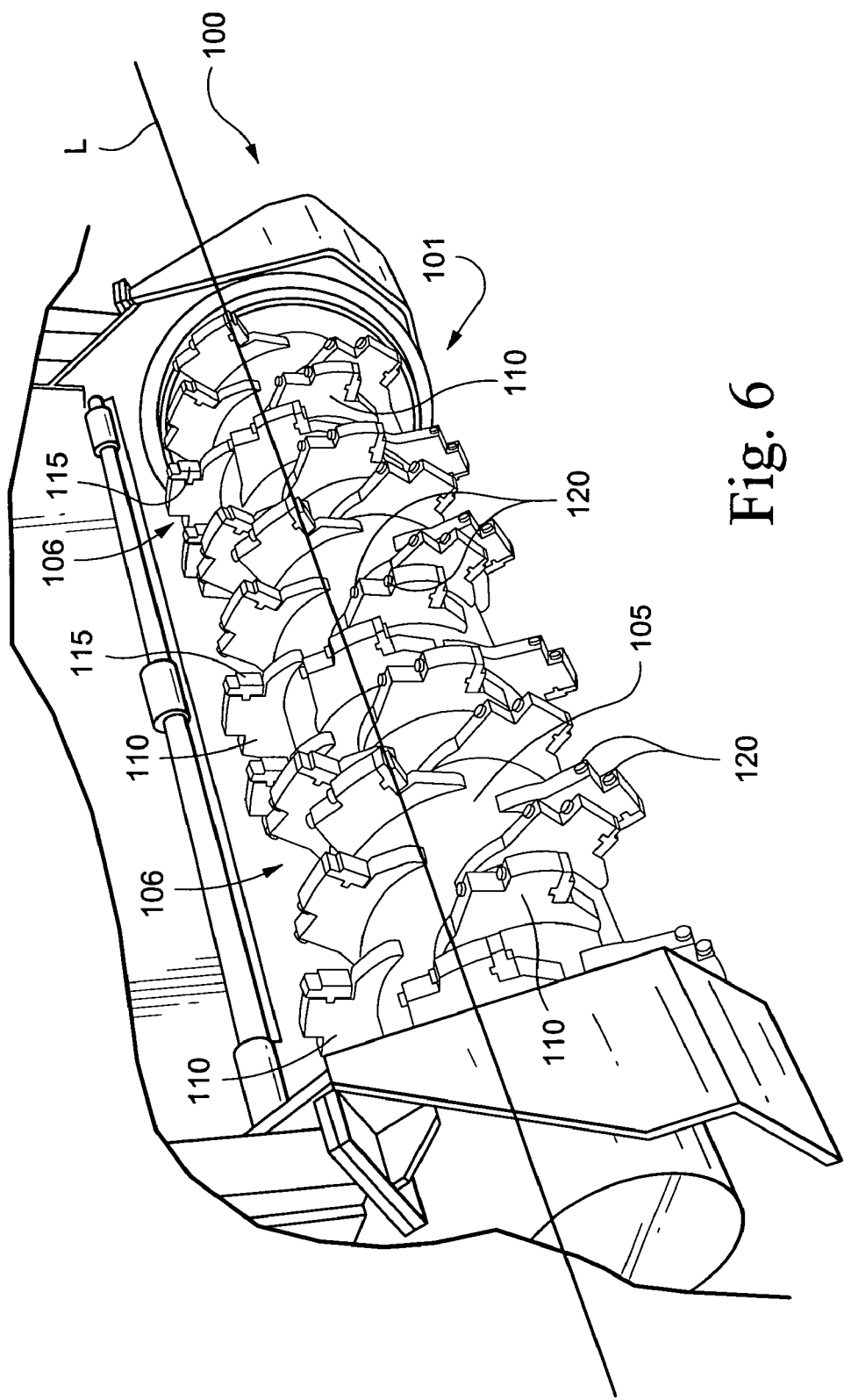
FIG. 6 is a portion of a mulcher apparatus according to an embodiment of the present invention.

FIG. 6 illustrates a portion of a mulcher apparatus 100 according to one embodiment of the present invention. In this specification, the term mulcher apparatus is intended to be inclusive of grinders, wood chippers, tub grinders and horizontal grinders, etc. The mulcher apparatus 100 includes a tractor, for example, as shown in relation to FIG. 1. The mulcher apparatus 100 includes a mulching unit 101 that includes a rotor 105, e.g., in the form of a solid or hollow cylindrical drum, and a plurality of tooth assemblies 106 each having a holder 110 and a cutter element 115. Each of the holders 110 is mounted to the rotor 105, e.g., by welding. However, the holders 110 may be attached to the rotor 105 in a manner which is similar to that shown and described in relation to FIG. 2. Each holder 110 is structured to support the cutter element 115 along the bottom and/or rear walls thereof, e.g., the holder forms a step like configuration where the cutter element 115 may be supported along the rear and/or bottom surfaces thereof. The holder 110 and the cutter element 115 may be held together using a bolt, the head portions 120 of which are shown in FIG. 6, so that the cutter elements 115 can be easily removed and replaced.

FIG. 6 illustrates that the number of cutter elements 115 that engage the intended target are maintained at a minimum, for a maximum number of tooth assemblies 106. For example, although the rotor 105 includes about 36 or 66 tooth assemblies 106, for two sizes of mulchers, respectively, only from about 2 to 4 cutter elements 115 contact the target at the same time along cutting line L, thus decreasing the drain on the overall system and increasing average power available for the next series of cutting impacts between the tooth assemblies 106 and the target. This results in incremental chipping or nibbling a target by sequential contact, rather than simultaneous contact between a row of cutting elements and the target. Preferably, an equal number of cutting elements on opposite sides of the axial centerline of the drum 105 contact the target. Even more preferably, the simultaneous contact cutting elements are spaced approximately the same distance from and on opposite sides of the axial centerline, to help maintain balance.

Moreover, in one embodiment, for a rotating drum 105 having a length of 5 foot, there would be approximately 30-60 tooth assemblies 106, preferably about 45 tooth assemblies 106, only 2-4 of which contact the target at the same time since they are arguably offset as positioned on the drum. Stated differently, the drum 105 includes about 8-10 tooth assemblies per foot of drum. This is achieved by a unique pattern in which the tooth assemblies 106 are positioned on drum 105. For example, each drum includes 3-5 rows, preferably 4 rows of tooth assemblies 106.

Figure 6B:
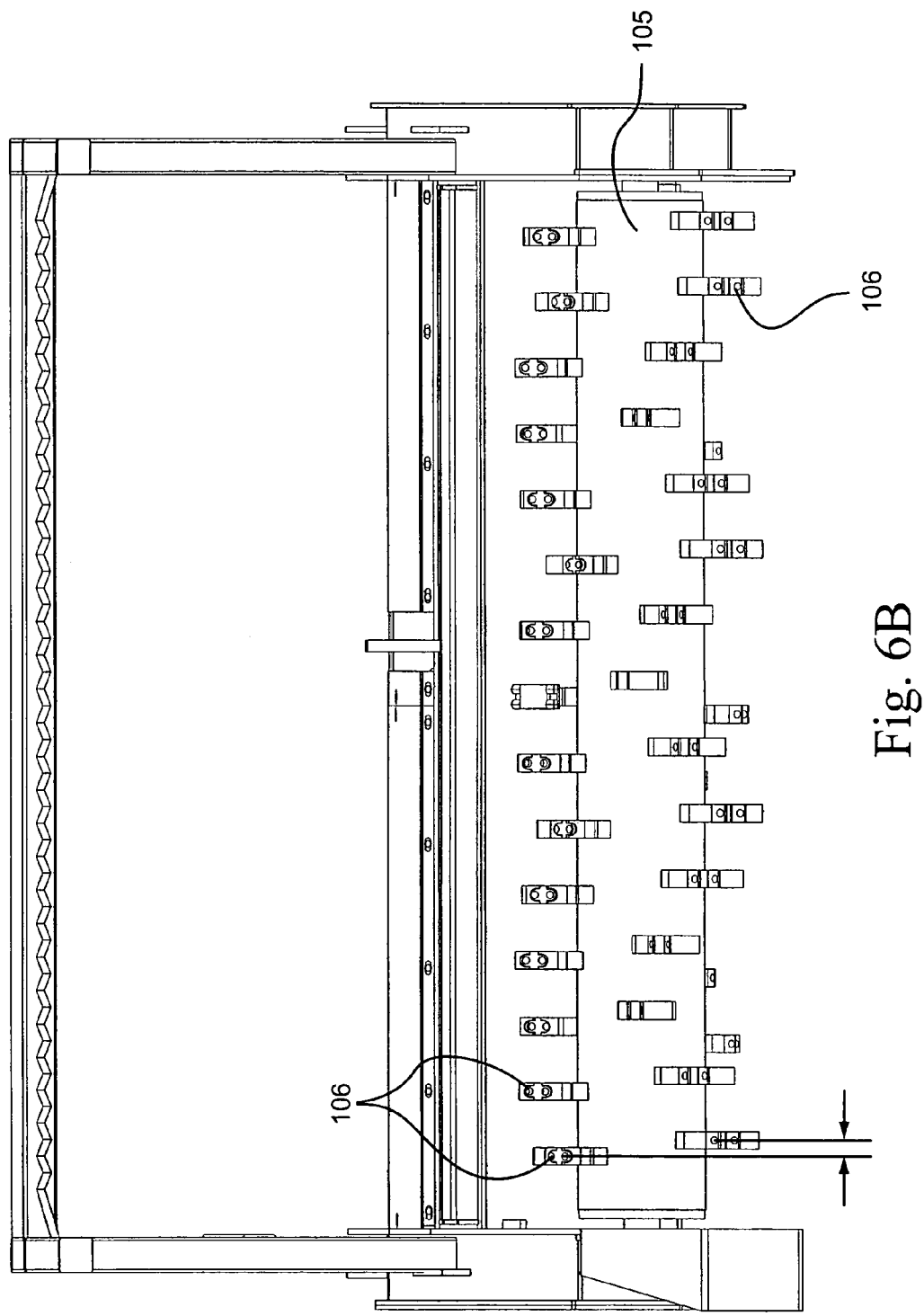

FIG. 6A is a perspective view of a mulching unit 101 in which drum is provided with several rows of tooth assemblies 106, 15 per row in this example, which means that the drum 105 includes 60 total tooth assemblies if 4 rows are utilized. Two complete rows are visible in FIG. 6A while a third row is partially visible and a fourth row not visible. FIG. 6A shows the holders without the cutting element, although one holder is shown with an exemplary cutting element or tooth. The pattern defined by the tooth assemblies in each row can be described as undulating, e.g., "W" or "M" shaped. The pattern of each row is designed to avoid more than a certain number of teeth from contacting the target at the same time, as described above, e.g., by positioning adjacent teeth in a row such that there is only a small degree of overlap of the holders. Further the teeth in adjacent rows have very little if any overlap, as shown in FIG. 6A. Moreover, as shown in FIG. 6B, the teeth in adjacent rows, e.g., the first tooth in a first row and the first tooth in a second row, are offset to ensure even and smooth cutting of the target.

Also, the base portion of the holder 110 is gently angled with respect to the rotor 105, e.g., the angle $\alpha$ is between about 5° and 60°, preferably 30°. See FIG. 7a. This structure minimizes the force, if any, created between the base portion of the holder 110 and the target, thereby minimizing damage to the base portion and obviating the need to provide a secondary cutting or deflecting element to the body portion. This structure also helps maintain the average power at a higher level in part because a leading edge 126 of the base portion simply slides past any debris and the target with less direct impact.

Figure 7A:
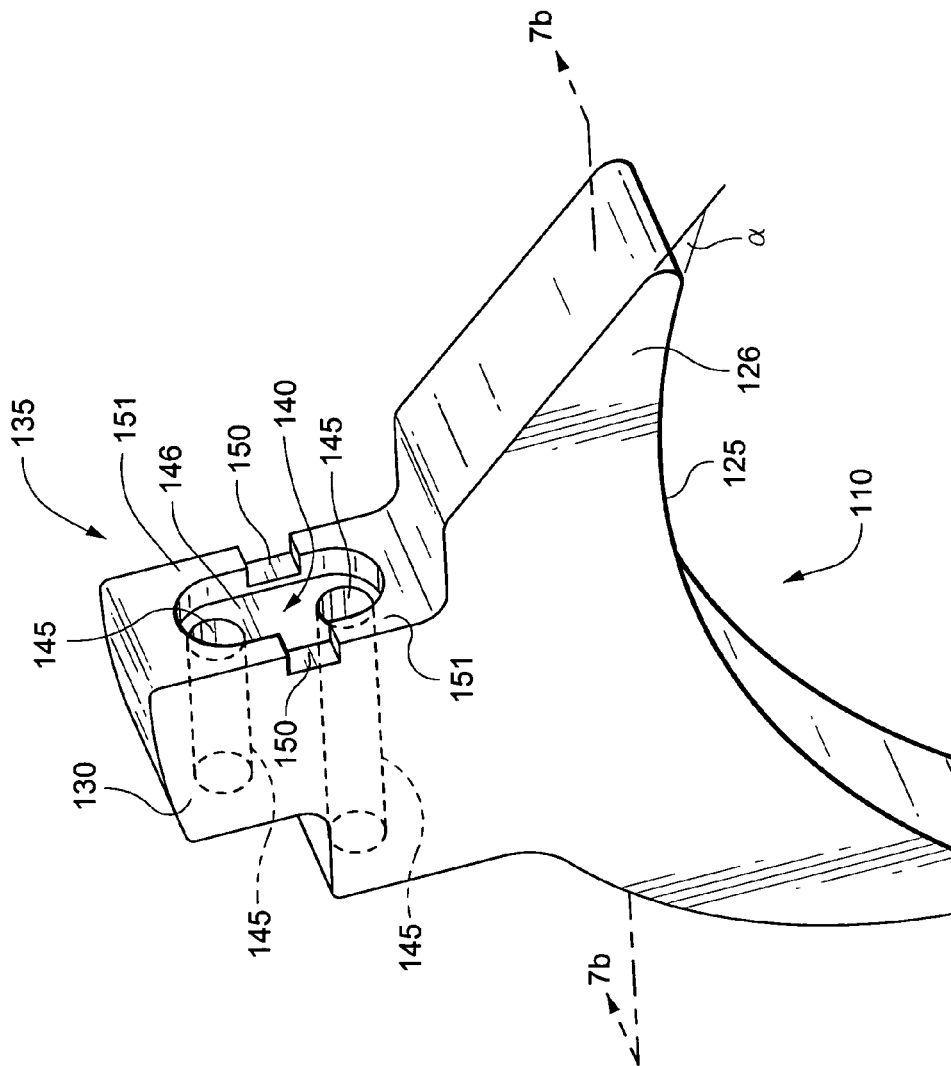
FIG. 7a is a perspective view of a holder for a cutting element according to an embodiment of the present invention.
Figure 7B:
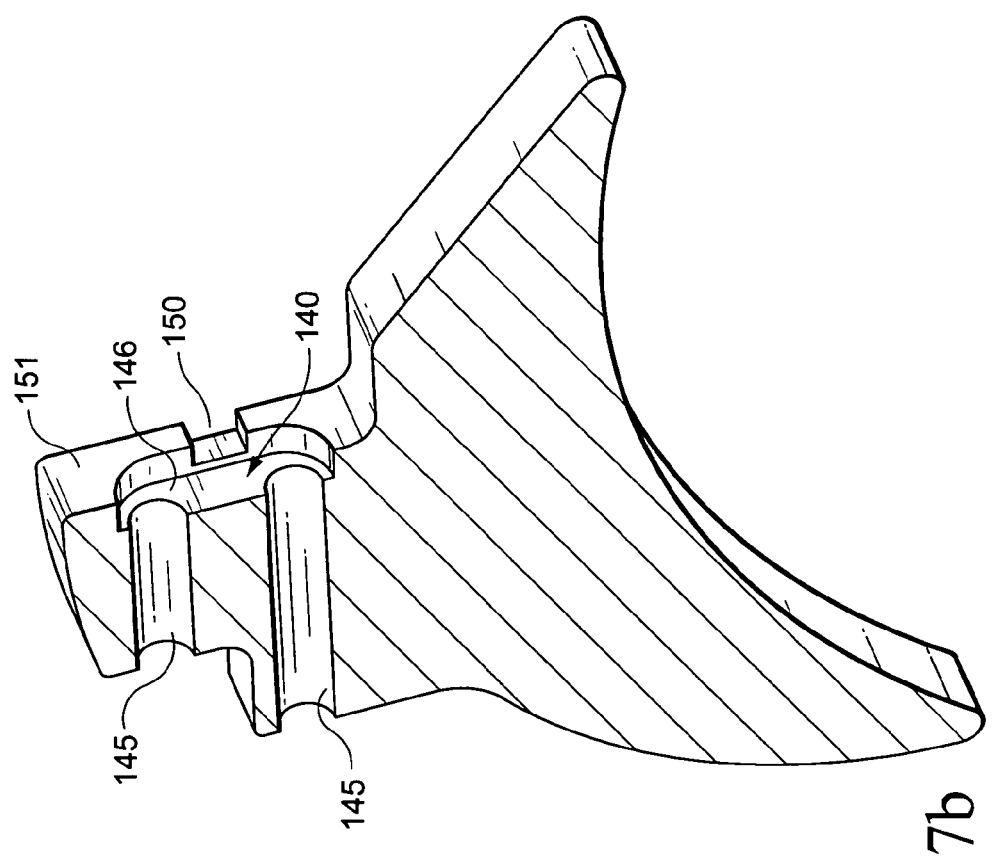
FIG. 7b is a cross section along line 7b-7b of FIG. 7.

FIG. 7a illustrates in perspective a first embodiment of a holder 110 according to the present invention. The holder 110 can be made of forged or cast iron materials, although it is preferred that the holder be machined or cut from a steel plate. The holder 110 includes a base portion 125 that is welded to or otherwise affixed to the rotor 105. The holder 110 includes a head portion 130 positioned opposite to the base portion 125. The head portion 130 includes a cutter element engagement portion 135 which in this embodiment includes an oval shaped countersunk recess or aperture 140 which is similar to that described in relation to related art FIGS. 1-5. The aperture 140 is sunken into the surface of the cutter element engagement portion 135. At least one and preferably a pair of through holes 145 are provided on the inside surface 146 of the aperture 140. A pair of notch portions 150 can be machined, cut or otherwise provided to the side wall portions 151 defining the sides of the aperture 140. FIG. 7b is a cross-sectional view of FIG. 7a.

Figure 9:
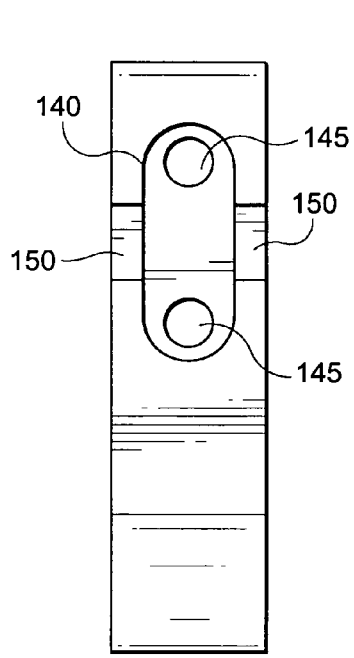
FIG. 9 is a front view thereof.
Figure 8:
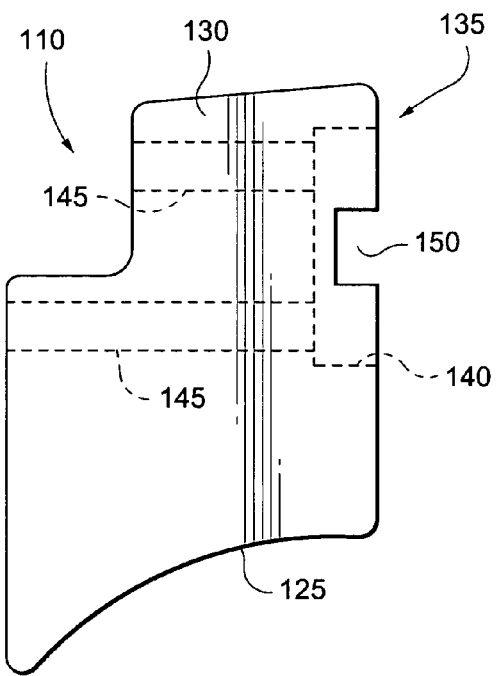
FIG. 8 is a right side view of a holder for a cutting element according to another embodiment of the present invention.
Figure 10:
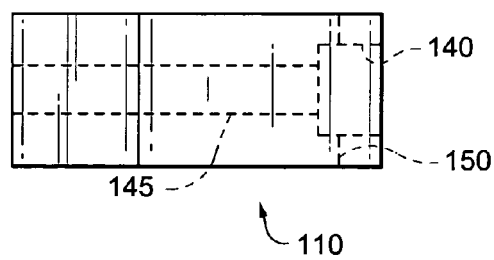
FIG. 10 is a top view thereof.
Figure 21:
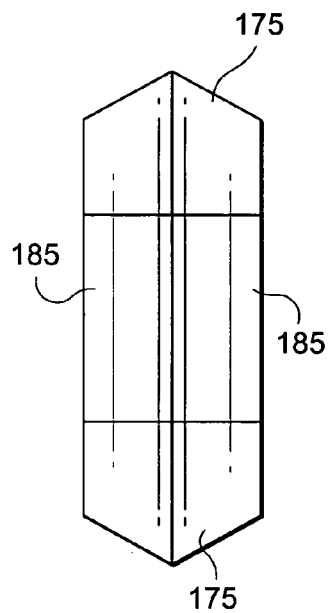
FIG. 21 is a left side view thereof.
Figure 19:
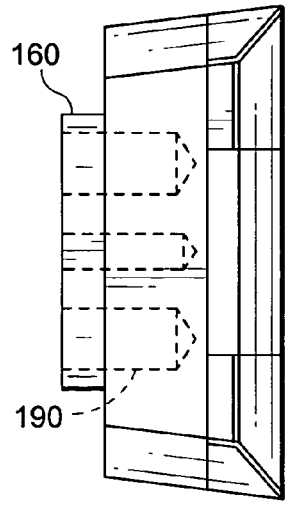
FIG. 19 is a side view of a cutter element designed according to yet another embodiment of the present invention.

FIGS. 8-10 illustrate side, front and top views of a holder 110, similar to that shown in FIG. 7a. Moreover, the leading and trailing ends of the holder in FIGS. 8-10 has been truncated, to reduce weight and material cost.

The holder in FIG. 7a is somewhat similar to a related art holder, but has been adapted to include, among other things, notch portions 150, the significance of which will be described below in relation to various cutter elements.

FIGS. 11-22c illustrate various embodiments of cutter elements which may be used in conjunction with the holder 110 shown in FIGS. 7a-10.

FIGS. 11-14 illustrate a cutter element 155 including a protruding oval or hour-glass shaped shroud 160 that is complimentary to the shape of the aperture 140 in FIG. 7a. FIGS. 11, 12 and 14 show a cross bar 165 that is intended to interlock with the notch portions 150 provided in side walls 151 of the holder 110 shown in FIG. 7a. The cross bar 165 may protrude from a rear surface 170 an amount which is equal to the amount the shroud 160 protrudes from the rear surface 170. However, the depth of the cross bar 165 may be less than the depth of the shroud 160, in which case the depth of the notch portions 150 and the depth of the aperture 140 would be different, as shown in FIG. 7a. A tip portion 175 may include a carbide coating 176, to increase strength or durability. In addition, a main body portion 180 may include angled front wall portions 185 to help laterally disperse debris as it is cut. FIG. 14 shows the angle β at which the front wall portions 185 converge or meet, e.g., β is about 15-45°, or preferably 30°, from vertical. In this example, the angles of the front wall portions 185 and the angles of the converging walls of the tip portion 175 are the same, although they could be different. The cutter element 155 is provided with one and preferably a pair of threaded bores 190, which in this case are blind bores.

FIGS. 15-18 illustrate another embodiment of a cutter element according to the present invention that may be used with the holder 110 shown in FIGS. 7-10.

The embodiment of FIGS. 15-18 is similar to the embodiment of FIGS. 11-14 except that the embodiment of FIGS. 15-18 includes a pair of opposite tip portions 175. Accordingly, when one tip portion 175 has been spent or damaged, the cutter element can be removed and rotated 180°, thereby providing the fresh tip portion to the targeted cutting or mulching surface. Although the embodiment of FIGS. 15-18 provides for two tip portions 175, it is also contemplated that three or more tip portions may also be provided. For example, the cutter element may assume the configuration of a triangle with cutting elements provided at the apices.

Figure 20:
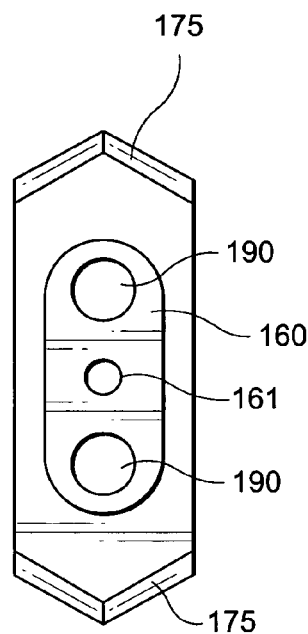
FIG. 20 is a right side view thereof.

The embodiment of FIGS. 19-22 is similar to the embodiments of FIGS. 15-18, except that the embodiment of FIGS. 19-22 is not provided with a cross bar. In this embodiment, a shroud 160 engages with the aperture 140 in FIG. 7a, and the notch portions 150 in FIG. 7a are not utilized. FIG. 20 shows an aperture 161, the purpose of which is to provide an additional or alternative means by which the shroud may be fastened to the main body, in the event the shroud is not formed in a single piece with the main body.

Figure 22:
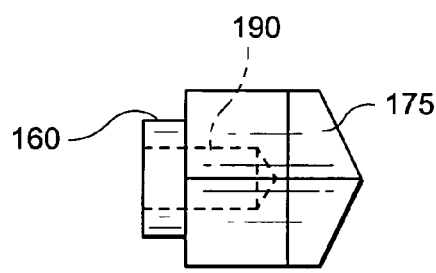
FIG. 22 is a top view thereof.
Figure 22B:
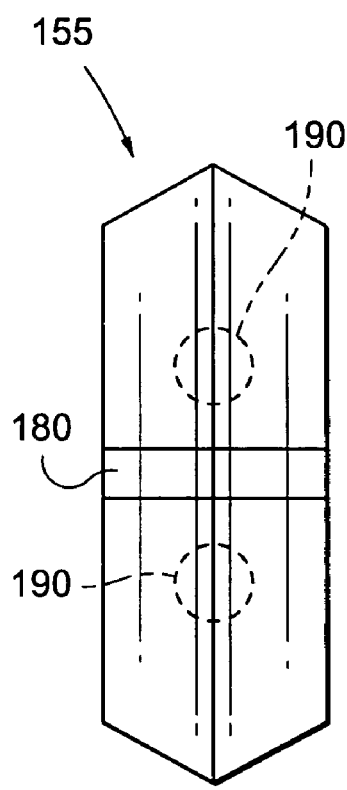
FIGS. 22b and 22c illustrate yet another embodiment of the present invention.
Figure 22C:
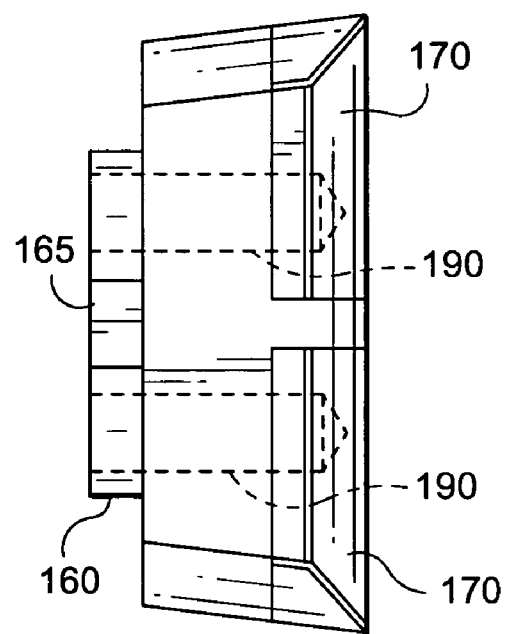

FIGS. 22b and 22c illustrate an embodiment of the invention in which a cutter element 155 includes a main body 180 and a shroud 160. The main body and shroud include one and preferably two bores, e.g., blind bores 190. The bores 190 extend into each of the tip portions 170. Accordingly, rather than replacing the entire cutter element 155, only the tip portions 170 need be replaced when spent.

FIGS. 23-25 illustrate yet another embodiment of a holder 195 according to the present invention. The holder 195 of FIGS. 23-25 differs from the holder 110 shown in FIGS. 7a-10 in that the aperture 140 in FIG. 7a is not provided in the embodiment of FIGS. 23-25. Instead, the embodiment of FIGS. 23-25 only includes a notch portion 150 along with a pair of bores 145 offset on each side of the notch portion 150. The notch portions 150 shown in FIGS. 7a and 23 can be formed by machining, cutting or routing in a simple one step procedure. With the embodiment of FIGS. 23-25, the aperture 140 is not provided, which saves in assembly cost and manufacturing expense.

FIGS. 26-37 illustrate embodiments of cutter elements having cross bars 200 that are usable with the holders 110, 195 of either FIGS. 7a-10 or FIGS. 23-25. In the embodiments of FIGS. 26-37, the various cutter elements are provided with a cross bar 200 which is intended to interface with the notch portions 150 of FIGS. 7a-10 or 23-25.

The embodiment of FIGS. 26-29 includes a main body portion 205 provided with a pair of bores, e.g., through bores 210. Each corner portion of the main body 205 is provided with an angled tab portion 215 acting as the cutter element. The angled tab portions 215 are angled in the range of 15-45° (preferably 30°) from the vertical plane in FIG. 26, and the space 220 in FIG. 29 defines an angle of about 100-160° (preferably 120°) as shown, for example in FIGS. 26 and 29. Each angled tab portion 215 may be coated with a carbide material, thereby enhancing strength and/or durability. As shown in FIG. 29, a space 220 may be provided between the tip portions of the angled tab portions 215. The space 220 allows for debris to pass therebetween, thereby adding less load to the motor and thereby maintaining power at a more constant level.

Figure 32:
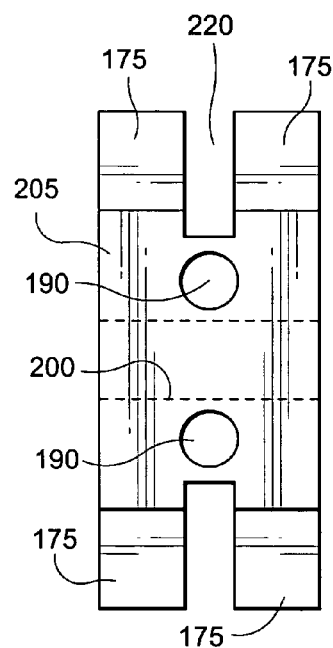
FIG. 32 is a left side view thereof.
Figure 30:
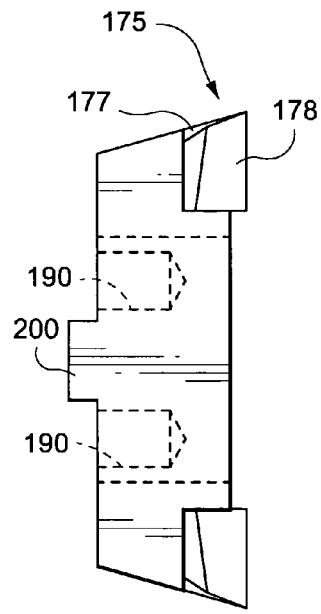
FIG. 30 is a side view of a cutter element according to another embodiment according to the present invention.
Figure 31:
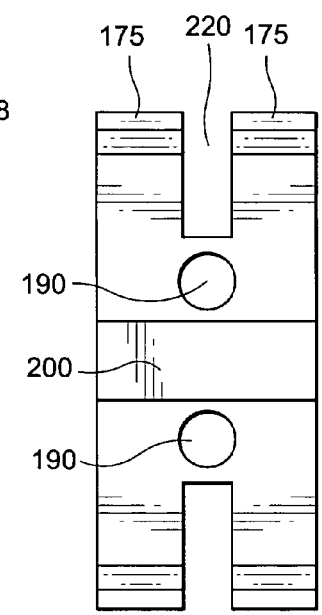
FIG. 31 is a right side view thereof.
Figure 33:
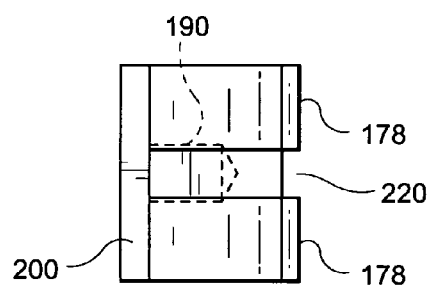
FIG. 33 is a top view thereof.
Figure 36:
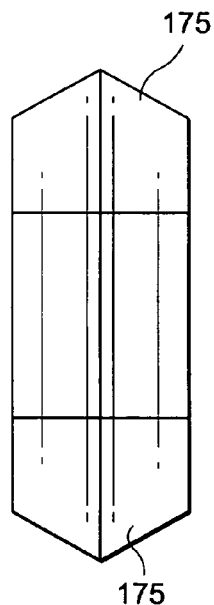
FIG. 36 is a left side view thereof.
Figure 34:
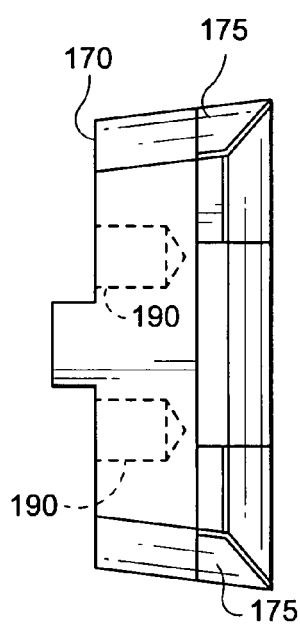
FIG. 34 is a side view of a cutter according to yet another embodiment according to the present invention.
Figure 35:
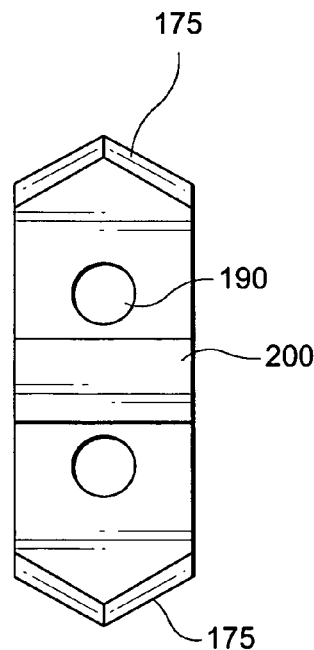
FIG. 35 is a right side view thereof.
Figure 37:
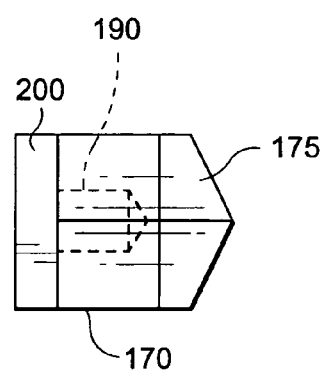
FIG. 37 is a top view thereof.

In the embodiment of FIGS. 30-33, the main body portion 205 has the general shape of an H, as best shown in FIGS. 31 and 32, including a cross portion and two upright portions, all combining to form the "H" shape. Each tip portion 175 is provided with a notch 177 to accommodate a carbide tip insert 178 which can be welded to or otherwise affixed to the main body portion 205. An aperture 220 is provided between adjacent ones of the tip portions 175 to allow debris to flow therethrough, as described above in relation to the embodiment of FIGS. 26-29.

The embodiment of FIGS. 30A-33A is similar to the embodiment of FIGS. 30-33, where like reference numbers denote like parts. However, there are several main differences between the embodiments. First, aperture 220' includes a base wall portion that is inclined so as to guide debris over the top edge of the tooth's holder. See, e.g., holder 135 in FIGS. 8-10. Aperture 220' may be provided with a carbide insert 207 to better counteract the wear and tear associated with passing debris. Carbide insert 207 may include a tip portion 209 that extends slightly above aperture 220' to ensure that debris is channeled and guided above holder 135 (FIG. 8). Second, main body portion 205 includes angled edges 203 to decrease friction and/or interaction with passing debris. This structure results in decreased material usage and weight as well. For similar reasons, the front and/or top portions 178a, 178b of tip inserts 178 are angled. Top portions 178b converge with one another and one angled at about 0-10° relative to one another.

The cutter element embodiment of FIGS. 34-37 is similar to the embodiment of FIGS. 15-18, but includes only a cross bar 200 rather than the cross bar 165 and a shroud 160, as in the embodiment of FIGS. 15-18.

FIGS. 38-40 illustrate yet another embodiment of a holder 110 according to the present invention. The embodiment of FIGS. 38-40 is similar to the embodiment of FIGS. 23-25, except that the notch portion 150 is provided in alignment with one of the bores 145, in this case the upper bore 145.

Figures 41, 42:
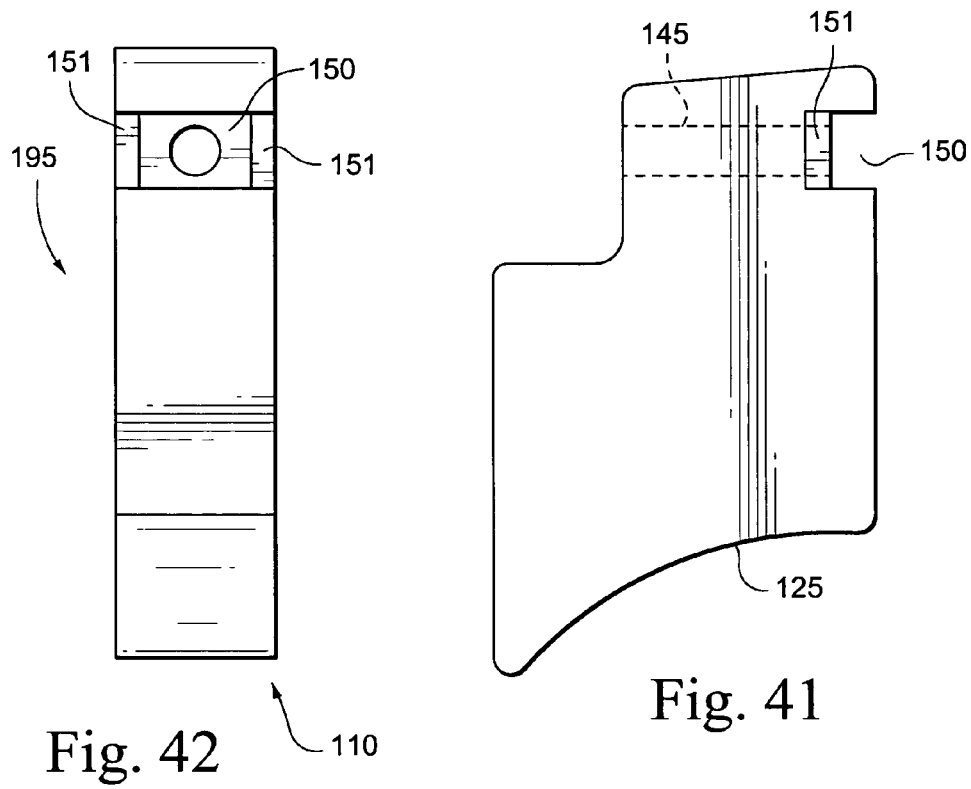
FIG. 41 is a side view of a holder according to still another embodiment of the present invention.
FIG. 42 is a right side view thereof.
Figure 43:
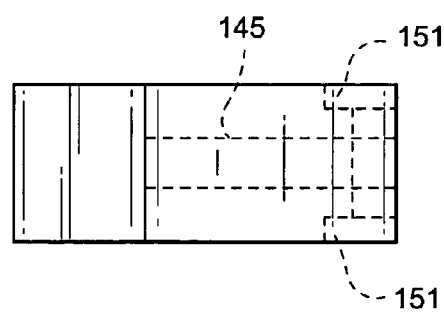
FIG. 43 is a top view thereof.
Figure 46:
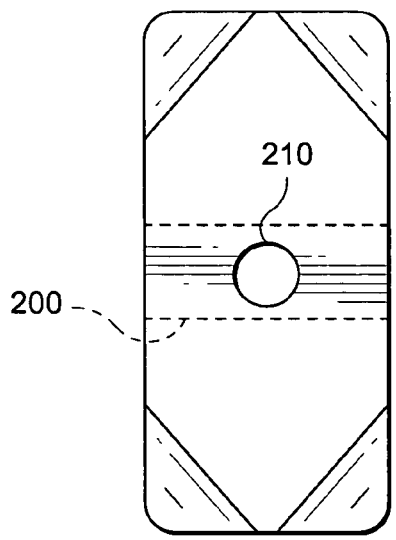
FIG. 46 is a left side view thereof.
Figure 44:
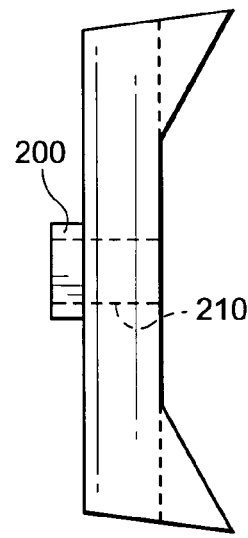
FIG. 44 illustrates still another cutter element according to an embodiment of the present invention.
Figure 45:
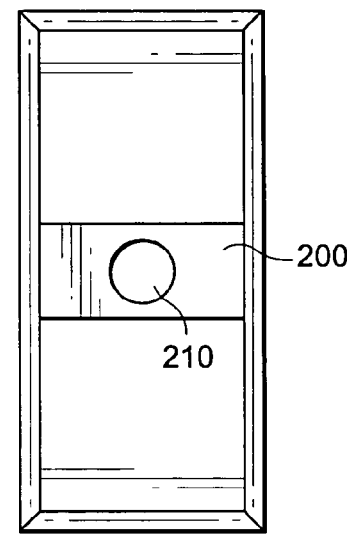
FIG. 45 is a right side view thereof.
Figure 47:
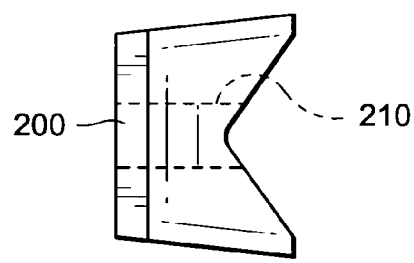
FIG. 47 is a top view thereof.

FIGS. 41-43 illustrate yet another embodiment of a holder according to the present invention. This embodiment is similar to that shown in FIGS. 38-40, except for only a single bore 145 is provided in the holder.

FIGS. 44-51 illustrate embodiments of cutter elements adapted for use with the holder embodiment shown in FIGS. 38-43. The embodiment of FIGS. 44-47 is similar to the embodiment of FIGS. 26-29, except for a single bore, e.g., through bore 210, is provided in the embodiment of FIGS. 44-47. In addition, the through bore 210 is in alignment with the cross bar 200 as compared to being offset with respect to the cross bar. Where the bore 210 passes through the cross bar, the cross bar preferably has a width at least equal to, and preferably wider than, the diameter of the bore. The cross bar should preferably extend over the entire width of the main body of the cutter element, although that is not necessary. Accordingly, the through bore 210 aligns with the through bore 145 in the holder embodiments of FIGS. 38-43.

The embodiment of FIGS. 44A-47A is similar to the embodiment of FIGS. 44-47. However, the cutter element in FIGS. 44A-47A includes lateral wing portions 201 on each side of the cross bar 200, for purposes of stability. In order to facilitate use with holder 195 shown in FIGS. 41-43, notch portion 150 may be provided with side notch portions 151 that are dimensioned to receive lateral wing portions 201.

The embodiment of FIGS. 48-51 is similar to the embodiment shown in FIGS. 30-33 except that a single bore, e.g., through bore 190, is provided in the embodiment of FIGS. 48-51. The through bore 190 is provided in alignment with the cross bar 200. Accordingly, the through bore 190 in the embodiment of FIGS. 48-51 aligns with the through bore 145 in the embodiments of the holder shown in FIGS. 38-43.

FIGS. 53-63 illustrate embodiments of an adapter according to the present invention. The adapter is intended to be used where the interfacing surfaces of a given cutter element and a given cutter element engagement portion of a holder are incompatible. For example, if the holder is provided with an oval shaped recessed aperture 140, but without the notch portions 150 shown in FIG. 7a, and the cutter element is provided with only a cross bar, the use of an adapter would be appropriate. Of course, the adapter could be used even if the cutter element and holder are compatible, e.g., to render the cutting tip offset with respect to the other cutter tips.

Figure 53:
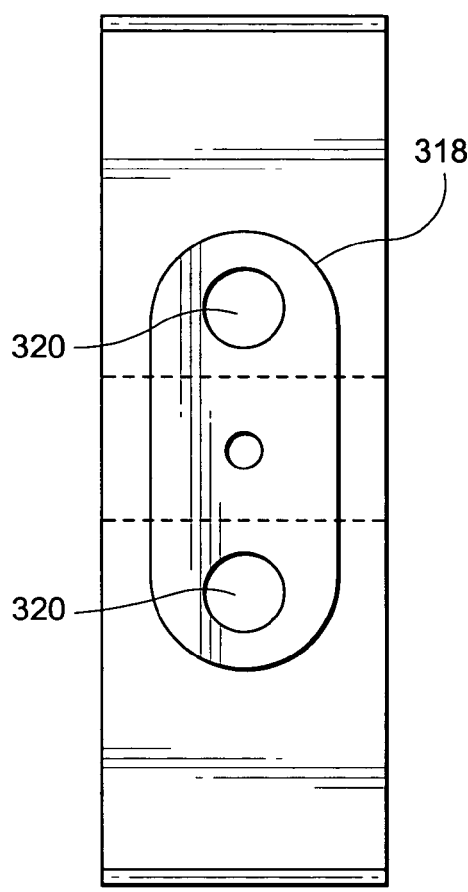
FIG. 53 is a left side view thereof.
Figure 52:
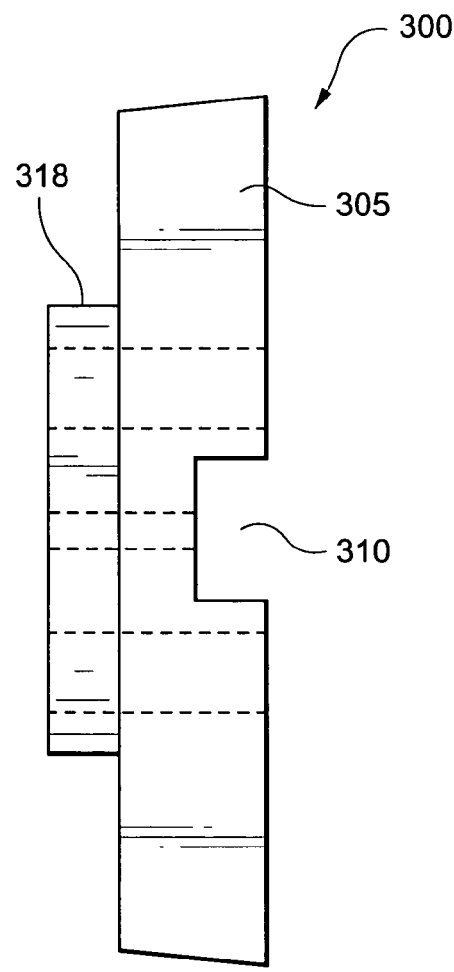
FIG. 52 illustrates an adapter according to an embodiment of the present invention.
Figure 54:
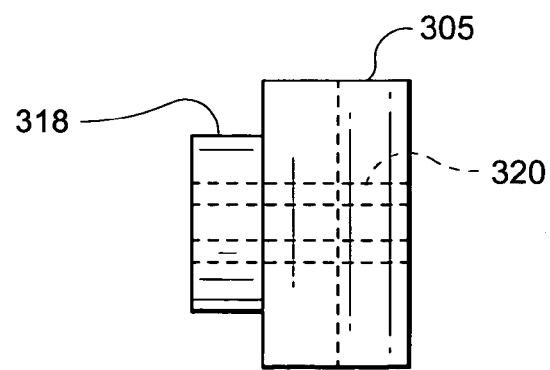
FIG. 54 is a top view thereof.

The embodiment of FIGS. 52-54 shows an adapter 300 including a main body 305 provided with a centrally located notch portion 310 and shroud 318. The shroud 318 includes at least one and preferably a pair of threaded bores 320. The threaded bores 320 can be either through bores or blind bores, although through bores are shown in FIGS. 52 and 53. This embodiment is useful for cutter elements that include a cutting tip portion provided on one end of the main body 305. However, the adapter 300 shown in FIGS. 52-54 can also be used with cutter elements having cutting tip portions provided on each end of the main body 305.

Figure 56:
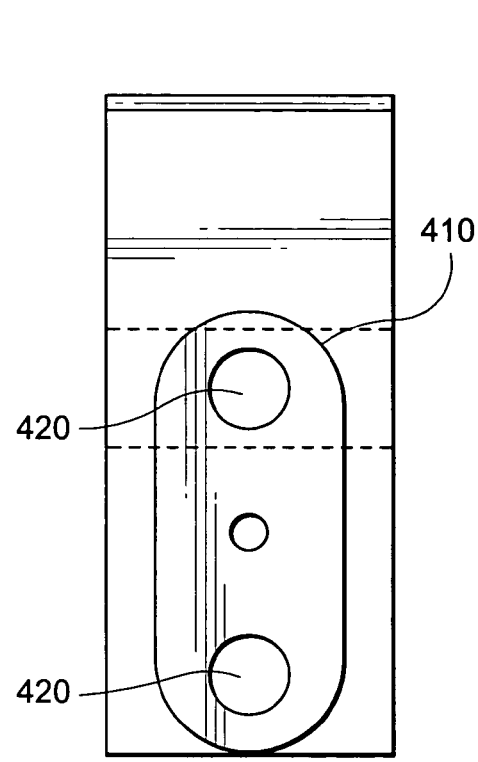
FIG. 56 is a left side view thereof.
Figure 55:
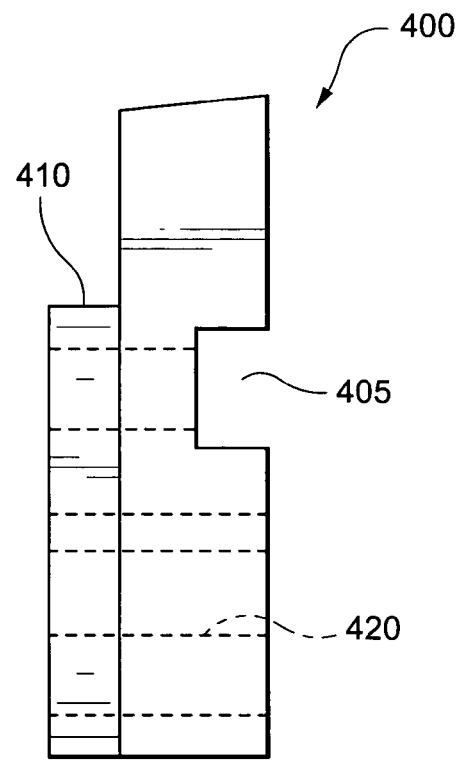
FIG. 55 illustrates an adapter according to another embodiment of the present invention.
Figure 57:
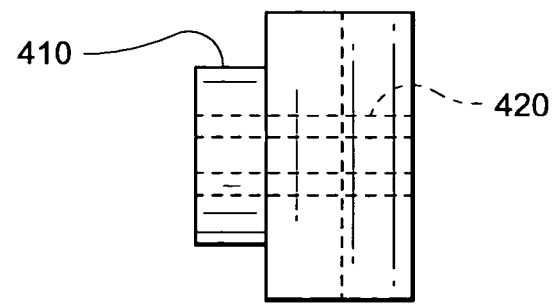
FIG. 57 is a top view thereof.

FIGS. 55-57 illustrate another embodiment of an adapter 400 according to the present invention. The adapter 400 includes a centrally located notch portion 405 and an asymmetrically oriented shroud 410. This embodiment is particularly useful when it is desired to offset the tip portion of a cutter element with respect to the base portion of the holder, e.g., when using a double ended cutter element.

In the embodiment of FIGS. 58-60, an adapter 500 is provided with a centrally located notch 505. Instead of the shroud 410 of the embodiments of FIGS. 52-54, the embodiment of FIGS. 58-60 includes a pair of cylindrical extensions 510 which are intended to meet with either a pair of separate apertures or a single oval shaped aperture provided in the holder. In addition, the adapter 500 may include one or more cross bars 521, 523, 525 provided adjacent to or between the cylindrical extensions 510.

The embodiment of FIGS. 61-63 shows an adapter 600 having a main body 605 including a centrally located notch 610. The main body 605 is also provided with a shroud 615 as well as a cross bar 620. This embodiment of the adapter 600 is particularly useful for use with the holder as shown in FIGS. 7a-10.

In yet another embodiment, the adapter may simply include one or more cross bars 521, 523, 525 (FIGS. 58-60) and/or 620 (FIGS. 61-63), without cylindrical extensions, a shroud, etc. See, e.g., FIG. 58A.

FIGS. 64-69A illustrate variations of the shape of the cross bar 200 shown in FIG. 30, which is illustrated as rectangular or square in cross-section. In particular, the cross-sectional shape of the cross bar may include, for example, a tapered shape as shown in FIG. 64, a ramped shape as shown in FIG. 65, a part rectangular and part curved or arch shape as shown in FIG. 66, a fully arcuate or semi-circular shape as shown in FIG. 67, an arrow shape as shown in FIG. 68, an inverse cut as shown in FIG. 69, a Woodruff key assembly as shown in FIG. 69A, or a combination thereof. In the case of FIG. 69A, the Woodruff key assembly 800 includes a Woodruff key 802 having a first end 804 that is seated within a groove of the holder, and a second end 806 that is cured and dimensioned to fit with a similarly shaped groove 807 in the rear wall 808 of the main body 810 of the cutter element 812. Of course, the Woodruff key assembly can be positioned in other locations, and/or more than one Woodruff key assembly may be provided. Also, the flat first end 804 can be positioned in the rear wall 808 of the cutter element 812, and the curved second wall 806 can be received with a recess in the holder.

FIG. 70 is an exploded view of a holder 110 having a standard oval shaped aperture 140, an adapter 300 having an oval shaped shroud 360 for engagement with the aperture 140, a notch portion 150, and a cutter element 600 including a cross bar 200 for engagement with the notch portion 150 of the adapter 300. FIG. 71 is an assembled view of the holder 100, adapter 300 and cutter element 600 shown in FIG. 70.

Figure 73:
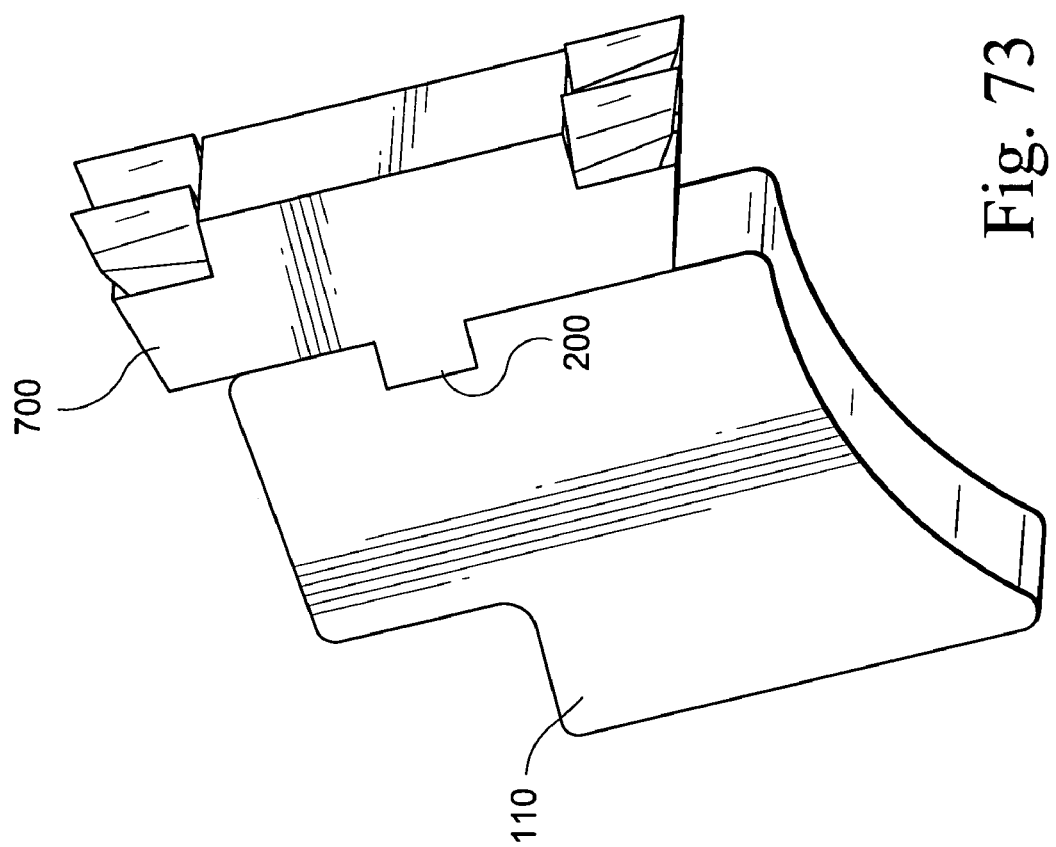
FIG. 73 is an assembled view thereof.

FIG. 72 is an exploded view of a holder 110 having a cross cut notch portion 150 and a cutter element 700 including a cross bar 200 for engagement with the notch portion 150 in the holder. In FIG. 72, holder may include up to three threaded or non-threaded bores, while cutter element 700 may include one or more blind threaded bores aligned with at least one of the bores in the holder 110. FIG. 73 is an assembled view of the holder 110 and cutter element 700 shown in FIG. 72.

Figure 74:
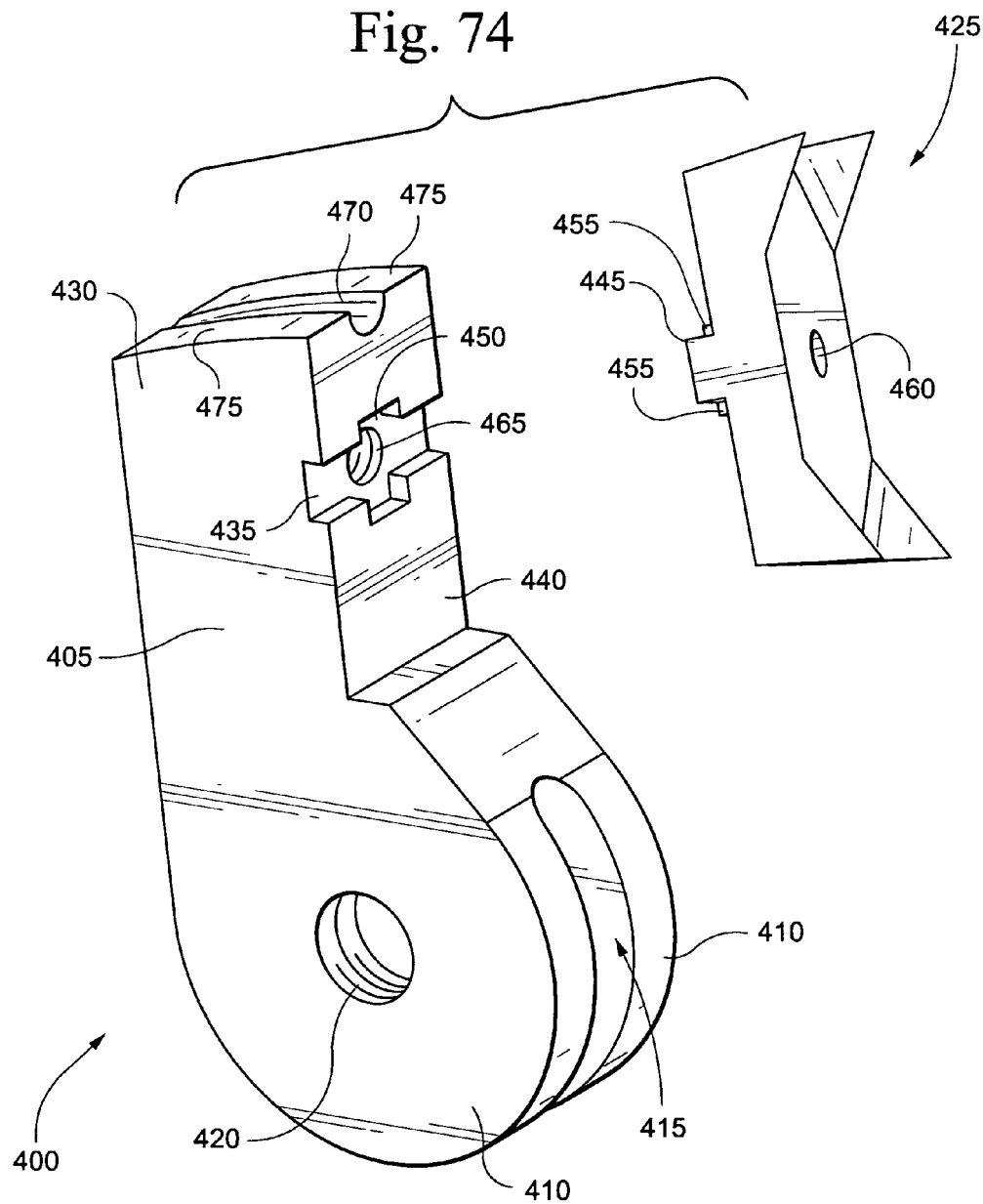
FIG. 74 is an exploded view of a holder and cutter element to another embodiment of the present invention.

FIG. 74 illustrates yet another embodiment of the present invention, usable with the cutter body as disclosed in U.S. Pat. No. 5,582,353, incorporated herein by reference. FIG. 74 shows a holder 400 that is intended to be mounted on a base element (not shown) that is fixedly mounted on a rotating cylindrical drum (not shown). The holder 400 includes a main body 405 including a pair of depending legs 410 having a space 415 therebetween. The base element on the rotating drum is intended to be positioned within the space 415. Upon alignment of through bores 420 (only one shown) in the legs 410 with a through bore in the base element, a connection element, e.g., a bolt, is threaded through the aligned bores to fix the holder 400 to the base element in a non-notable fashion. The fixed angular position of the holder 400 may be selectively adjusted to change the angle at which the cutter element 425 impacts or contacts the target.

The holder 400 includes a head portion 430 including a notch portion 435 extending across a leading face 440 of the head portion 430. The notch portion 435 is intended to receive and mate with a cross bar 445 provided on the cutter element 425. As an alternative, or in addition to the notch portion 435, the leading face 440 may be provided with a vertical notch portion 450 intended to receive and mate with a vertical bar or key portion 455 provided on the cutter element 425. Moreover, the embodiments described above may include a vertical key portion 455 in addition to or as an alternative to the shroud and cross bar arrangements described above. Of course, the geometrical configurations are possible., e.g., star shaped, X-shaped, etc., all of which help prevent relative rotation between the cutter element 425 and the holder 400.

The cutter element 425 in other respects is similar to that described in relation to FIGS. 44-47 described above. For example, the cutter element 425 includes a bore, e.g., a through bore 460, that extends through the cross bar 445 so as to receive a threaded bolt that extends through a bore 465 in the head portion 430 of the cutter element 400. Further, the head portion 430 may include a cut out portion 470 to allow debris to easily pass between adjacent leg portions 475 of the head portion 430.

The embodiment of FIG. 74 is advantageous because it provides for quick replacement of spent cutter elements with replacing the entire holder assembly. The cutter element 425 may include tip portions at each end so that the cutter element 425 may be removed and rotated 180° to place the unspent end in the cutting position.

The holder 410 and cutter element 425 may be modified to include any of the arrangements described above, and vice versa, without departing from the spirit of the invention. For example, as shown in FIG. 75 instead of an arrangement where the through bores 460 and 465 are aligned with the cross bar 445, one or a pair of bores may be provided in offset arrangement relative to the cross bar, as shown in various embodiments above, e.g., FIGS. 11-22c and 26-37. In addition, the cutter element and holder may be used with an adapter as described above, see, e.g., FIGS. 52-63. Finally, bore 420' can be formed of a non-circular or polygonal cross-section, so as to positively lock holder 410 against rotational movement when engaged with locking pin 401. In this case, a support bracket 451, which is fixed or otherwise provided to a rotating drum, may include a square (or other complementary non-circular) aperture 453.

Figure 76:
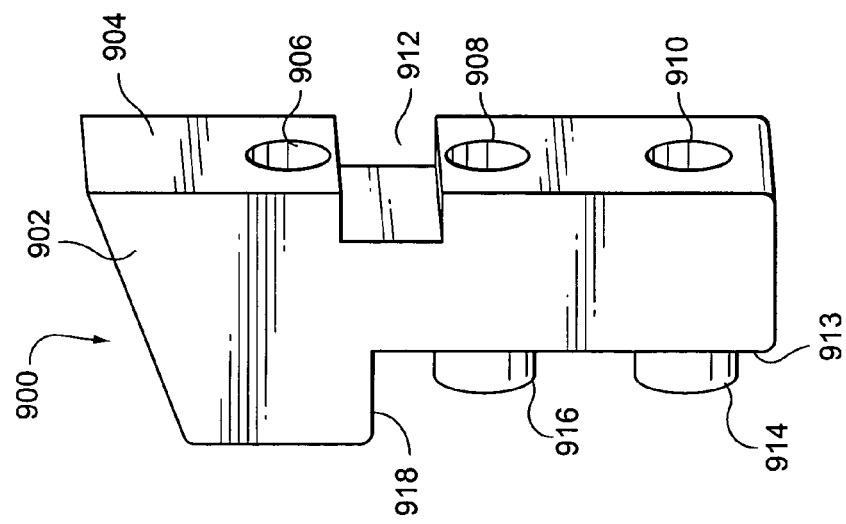
FIG. 76 is a front perspective view of an adapter according to another embodiment of the present invention.

FIGS. 76-79 show an adapter 900 according to another embodiment of the present invention. As shown in FIG. 76, the adapter includes a head portion 902 and a forwardly oriented surface 904 that includes through bores 906 and 908, as well as a threaded bore 910 which may be a blind bore or a through bore. Through bores 906 and 908 align with through or blind threaded bores in cutter element 600. Bores 906 and 908 are preferably non-threaded, although they could have threads if desired. The forward surface 904 also includes a notch 912 which is adapted to receive a cross bar of a cutter element.

Figure 80:
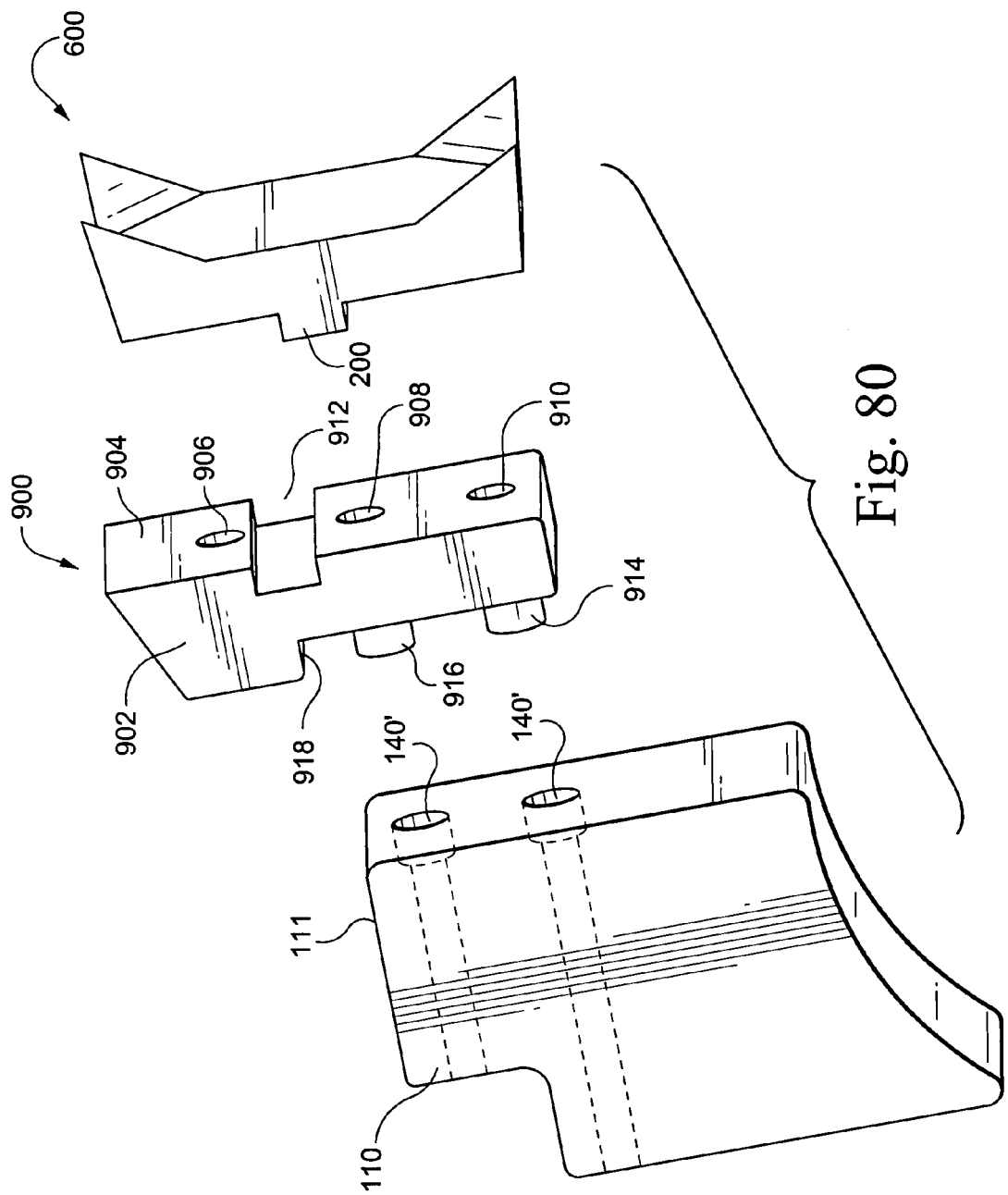
FIG. 80 is an exploded perspective view of a tooth assembly according to an embodiment of the present invention.

A rear surface 913 of the adapter 900 includes first and second cylindrical extensions which align with respective apertures 140' (FIG. 80).

The head portion 902 of the adapter 900 includes a rearwardly extending ledge portion 918 which is configured to rest or be positioned above a top surface 111 of holder 110. See FIG. 80.

Figure 77:
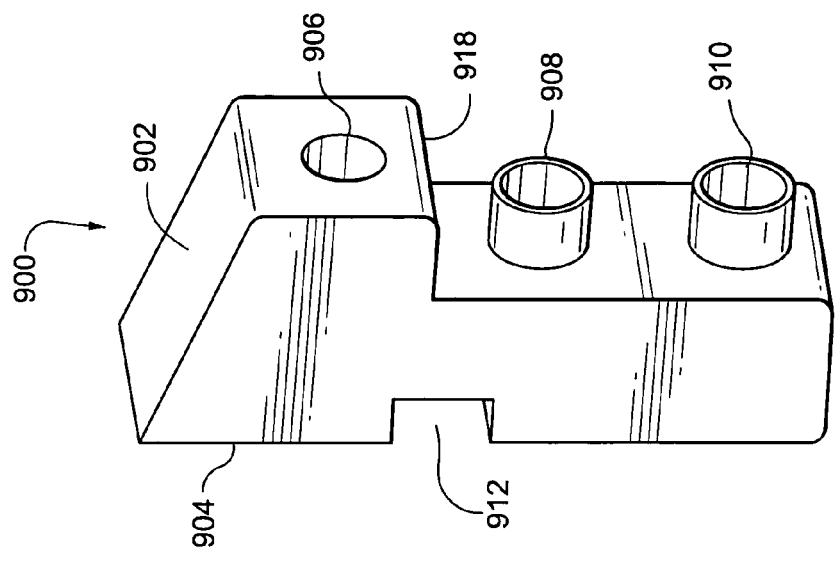
FIG. 77 is a reverse perspective view thereof.
Figure 79:
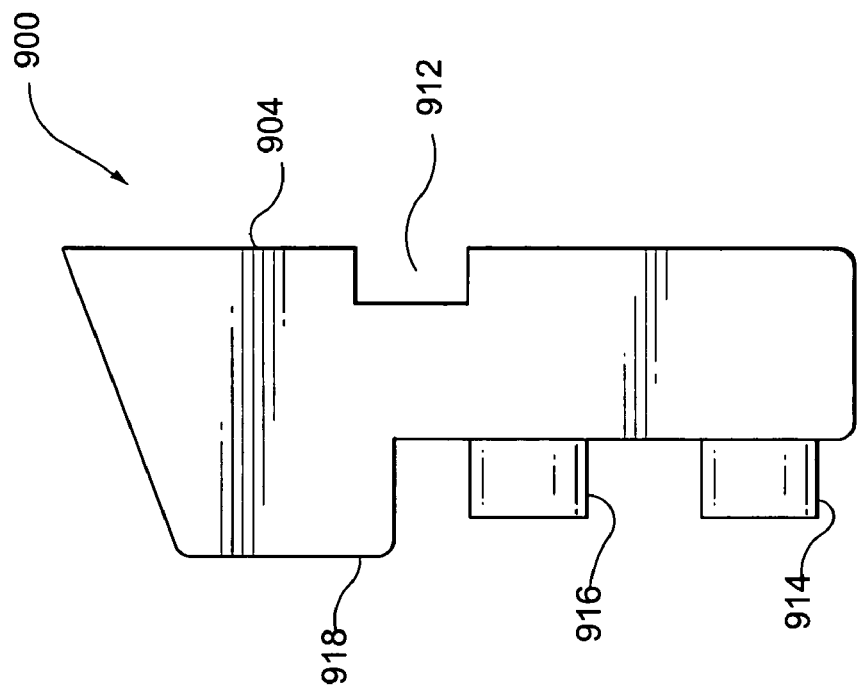
FIG. 79 is a right side view thereof, with the left side view being a mirror image thereof.
Figure 78:
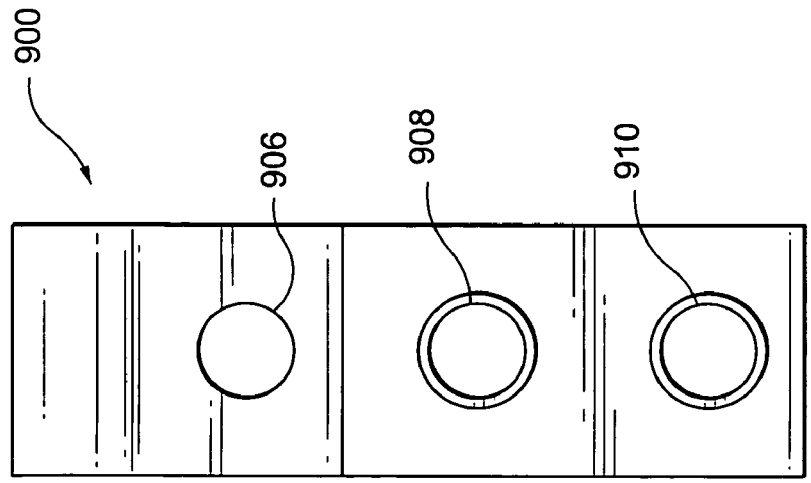
FIG. 78 is a rear view thereof.

FIGS. 77-79 illustrate additional views of the holder, while FIG. 81 shows the holder assembled together with the adapter 900 and an exemplary tooth 600. Of course, any tooth configured with a cross bar generally as shown in FIG. 80 can be used with the adapter 900. For example, the cutter element shown in FIGS. 30A-33A can be used with the adapter 900.

While the invention has been described in conjunction with preferred embodiments thereof, it is evident that many alternatives, modifications and variations may be apparent to those skilled in the art. For example, while the cutting assemblies include cutter elements which can be separated from their respective holders, it is also possible that the cutter elements be provided as an integral portion with the respective holder portion and that the holder portion be selectively removable from the rotor, for example. Further, while the holder has been described as including notch portions, and the cutter element has been described as including the cross bar, the positioning of the notch portions and the cross bar can be reversed. Accordingly, preferred embodiments of the invention as set forth herein are intended to be illustrative, not limiting. Various changes may be made without departing from the spirit and scope of the present invention.

What is claimed is:

1. A tooth assembly for a mulcher apparatus, comprising:
a holder including a base portion adapted to be connected to the mulcher apparatus and a head portion provided opposite the base portion, the head portion being provided with a cutter element receiving surface including at least one notch portion extending from one lateral side of the head portion to the other lateral side of the head portion; and
a cutter element provided to the head portion of the holder, the cutter element including at least one cross bar engaged with the at least one notch portion of the holder, said cutter element including at least first and second pre-threaded bores, said at least one cross bar being positioned between the at least first and second pre-threaded bores.

2. The tooth assembly of claim 1, wherein the holder includes at least a first holder bore extending from a front wall of the cutter element receiving surface to a trailing edge of the head portion, and the first cutter element bore aligns with the first holder bore upon engagement of the at least one notch and the at least one cross bar.

3. The tooth assembly of claim 2, wherein the holder includes a second holder bore and the second cutter element bore aligns with the second holder bore upon engagement between the at least one notch and the at least one cross bar.

4. The tooth assembly of claim 2, wherein the first bore of the cutter element is offset from the at least one cross bar.

5. The tooth assembly of claim 1, wherein the cutter element receiving surface of the holder includes a front wall portion and a bottom wall portion that form a step like configuration to cradle bottom and rear walls of the cutter element.

6. The tooth assembly of claim 5, wherein the bottom wall element of the holder includes an inclined leading wall portion that is structured to form an angle with a rotor of the mulcher apparatus in the range of about 5-60 degrees.

7. The tooth assembly as claimed in claim 1, wherein the base portion of the holder includes two spaced leg portions with a radially extending space therebetween, each said leg portion including a bore to receive a common fastening element for fixedly securing to the mulching apparatus.

8. The tooth assembly of claim 1, further comprising an adapter interposed between the holder and the cutter element.

9. The tooth assembly of claim 8, wherein the adapter includes a rearwardly oriented ledge portion positioned over or contacting an upper surface of the head portion of the holder.

10. The tooth assembly of claim 8, wherein the adapter element includes the cutter element receiving surface with the at least one notch.

11. The tooth assembly of claim 1, further comprising a countersunk aperture provided in the cutter element receiving surface of the holder, and a shroud with at least one pre-drilled bore provided to the cutter element, said shroud being sized to engage with the aperture of the holder.

12. The tooth assembly of claim 11, wherein the countersunk aperture and shroud are oval or hour-glass shaped.

13. The tooth assembly of claim 11, wherein the at least one notch portion includes at least two laterally spaced notch portions provided in side wall portions of the cutter element engagement surface that define the aperture.

14. The tooth assembly of claim 13, wherein the two laterally spaced notch portions substantially bisect the aperture.

15. The tooth assembly of claim 11, wherein a depth of the at least one notch portion is less than or equal to a depth of the aperture, and a length of the at least one cross bar is less than or equal to a length of the shroud.

16. A mulcher apparatus comprising:
a tractor with a plurality of wheels; and
a mulcher unit coupled to the tractor, the mulcher unit including the tooth assembly of claim 1.

17. A cutter element for a mulcher apparatus, comprising:
a main body including a rear portion configured to be mounted on a cutter element receiving surface of a holder and a front portion including at least one cutter tip portion, said rear portion including at least two pre-threaded bores provided in the main body; and
a cross bar provided to and extending from the rear portion of the main body, said cross bar being structured to engage with a notch portion on the holder, said cross bar being positioned between said two pre-threaded bores.

18. The cutter element of claim 17, further comprising a shroud including said two pre-threaded bores.

19. The cutter element of claim 18, wherein the shroud is one of oval shaped and hour-glass shaped.

20. The cutter element of claim 17, wherein the main body includes first and second ends each including at least one said cutter tip portion.

21. The cutter element of claim 20, wherein each end includes at least two cutter tip portions with a space provided between adjacent cutter tip portions.

22. The cutter element of claim 21, wherein the space is about as wide as one of the cutter tip portions.

23. The cutter element of claim 17, wherein the main body has a central portion with front element for a mulcher apparatus angled to deflect debris.

24. The cutter element as claimed in claim 17, further comprising a lateral wing portion provided to each side or end of the cross bar, each lateral wing extending rearwardly beyond the cross bar, each lateral wing being adapted to be received within side notch portions of the holder.

25. The cutter element of claim 17, wherein the main body is substantially rectangular and includes a plurality of corner portions with forwardly angled tab portions, each of said corner portions defining one said at least one cutter tip portion.

26. The cutter element of claim 25, wherein the main body includes first and second ends each of which includes a pair of corner portions.

27. The cutter element of claim 25, wherein a space is created between adjacent corner portions to allow the flow of debris through the space.

28. The cutter element of claim 25, wherein the main body, including the corner portions, are formed of cast materials.

29. The cutter element of claim 25, wherein each of the corner portions includes a carbide coating.

30. The cutter element of claim 17, wherein the main body has a generally H-shape with a cross component and two upright components, each of said upright components including first and second ends each provided with one said cutter tip portion, a space being provided between adjacent cutter tip portions to allow for the flow of debris through the space.

31. The cutter element of claim 30, wherein each of the first and second ends of the upright components includes a notch to receive a carbide tip insert provided to the notch.

32. The cutter element of claim 17, wherein the cross bar has a cross sectional shape selected from the group consisting of tapered, ramped, curvilinear, arcuate, semicircular, rectangular, square, arrow, Woodruff, and combinations thereof.

33. A mulcher apparatus comprising:
a tractor with a plurality of wheels;
a mulcher unit coupled to the tractor; and
at least one tooth assembly including a holder and the cutter element of claim 17.

34. A mulcher apparatus comprising:
a tractor with a plurality of wheels;
a mulcher unit coupled to the tractor;
a plurality of tooth assemblies, each said tooth assembly including a holder and a cutter element; and
a drum with a plurality of rows of said tooth assemblies, wherein:
adjacent tooth assemblies in each said row are circumferentially or angularly offset from one another so as to define an undulated cutting profile for each said row,
tooth assemblies in adjacent rows are axially offset from one another,
the drum includes about 8-10 of said tooth assemblies per linear foot of the drum, and the undulated cutting profile is substantially "M" or "W" shaped.

35. A cutter element for a mulcher apparatus, comprising:
a main body including a rear portion configured to be mounted on a cutter element receiving surface of a holder and a front portion including paired first and second cutter tip portions, wherein the main body includes first and second opposed ends, each said end including one of said paired first and second cutter tip portions, each of said paired first and second cutter tip portions being contained within a common cutting plane for effecting substantially simultaneous cutting action in use, and further comprising a channel positioned between said first and second cutter tip portions.

36. The cutter element of claim 35, wherein each said channel is about as wide as one of the cutter tip portions.

37. The cutter element of claim 35, wherein the main body has a central portion with front wall portions angled to deflect debris.

38. A cutter element for a mulcher apparatus, comprising:
a main body including a rear portion having a cross bar and being configured to be mounted on a cutter element receiving surface of a holder and a front portion including a plurality of cutter tip portions, wherein the main body is substantially rectangular and includes a plurality of corner portions with forwardly angled tab portions, each of said corner portions defining one of said citter tip portions.

39. The cutter element of claim 38, wherein the main body includes first and second ends each of which includes a pair of said corner portions.

40. The cutter element of claim 38, wherein a space is created between adjacent corner portions to allow the flow of debris through the space.

41. The cutter element of claim 38, wherein the main body, including the corner portions, are formed of cast materials.

42. The cutter element of claim 38, wherein each of the corner portions includes a carbide coating.

43. A cutter element for a mulcher apparatus, comprising:
a main body including a rear portion configured to be mounted on a cutter element receiving surface of a holder and a front portion including at least one cutter tip portion, wherein the main body has a generally H-shape with a cross component and two upright components, each of said upright components including first and second ends each provided with one said cutter tip portion, an aperture being provided between adjacent cutter tip portions to allow for the flow of debris through the space.

44. The cutter element of claim 43, wherein each of the first and second ends of the upright components includes a notch to receive a carbide tip insert provided to the notch.

45. The cutter element of claim 43, wherein each aperture is defined by a base wall portion that extends at an angle between the upright components.

46. The cutter element of claim 45, wherein the base wall portion includes a carbide insert.

47. The cutter element of claim 46, wherein the carbide insert extends above the main body to guide debris above the holder.

48. The cutter element of claim 43, wherein the main body includes angled lateral sides.

49. The cutter element of claim 43, wherein each cutter tip portion has front face portions that converge and form a cutting edge in the direction of cutting.

50. The cutter element of claim 43, wherein each cutter tip portion has top face portions that converge at a shallow angle of about 0-10°.

51. The cutter element of claim 43, wherein the main body includes at least a first bore that is threaded.

52. The cutter element of claim 51, wherein the first bore is aligned with and formed at least partially within a cross bar formed on a rear surface of the main body.

53. The cutter element of claim 52, wherein the diameter of the first bore is greater than a width of the cross bar.

54. The cutter element of claim 43, wherein the main body includes first and second threaded bores, and a cross bar is provided on a rear surface of the main body between the first and second threaded bores.

* * * * *